(12) United States Patent
Zhang et al.

(10) Patent No.: US 11,343,501 B2
(45) Date of Patent: May 24, 2022

(54) VIDEO TRANSCODING METHOD AND DEVICE, AND STORAGE MEDIUM

(71) Applicants: CENTRAL SOUTH UNIVERSITY, Changsha (CN); TENCENT TECHNOLOGY (SHENZHEN) COMPANY LIMITED, Shenzhen (CN)

(72) Inventors: Hao Zhang, Shenzhen (CN); Jianguang Wang, Shenzhen (CN); Xuerui Ma, Shenzhen (CN); Liang Wang, Shenzhen (CN); Haichang Zhai, Shenzhen (CN); Nianbo Liao, Shenzhen (CN)

(73) Assignees: CENTRAL SOUTH UNIVERSITY, Changsha (CN); TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/087,514

(22) Filed: Nov. 2, 2020

(65) Prior Publication Data

US 2021/0051327 A1 Feb. 18, 2021

Related U.S. Application Data

(63) Continuation of application No. PCT/CN2019/090395, filed on Jun. 6, 2019.

(30) Foreign Application Priority Data

Oct. 12, 2018 (CN) .......................... 201811191653.7

(51) Int. Cl.
*H04N 19/124* (2014.01)
*H04N 19/146* (2014.01)
(Continued)

(52) U.S. Cl.
CPC ......... *H04N 19/124* (2014.11); *H04N 19/146* (2014.11); *H04N 19/172* (2014.11); *H04N 19/60* (2014.11)

(58) Field of Classification Search
CPC .... H04N 19/00; H04N 19/124; H04N 19/146; H04N 19/172; H04N 19/60
See application file for complete search history.

(56) References Cited

U.S. PATENT DOCUMENTS

| 2012/0269258 A1 | 10/2012 | Yang et al. |
| 2016/0007038 A1 | 1/2016 | Chou et al. |

(Continued)

FOREIGN PATENT DOCUMENTS

| CN | 105376568 A | 3/2016 |
| CN | 106937112 A | 7/2017 |

(Continued)

OTHER PUBLICATIONS https://web.archive.org/web/20151120161522/https://en.wikipedia.org/wiki/Sum_of_absolute_transformed_differences (Year: 2015).*

(Continued)

*Primary Examiner* — Kyle M Lotfi
(74) *Attorney, Agent, or Firm* — Anova Law Group, PLLC

(57) ABSTRACT

A video transcoding method is provided for a video transcoding device. The method includes obtaining a video sequence in source video data, which comprises a plurality of video sequences arranged in a sequence arrangement order; obtaining a source video frame in the video sequence; and obtaining a first ratio of a sum of absolute transformed differences of an initial frame in the video sequence to a bit rate of the video sequence. The method also includes adjusting a quantization parameter of the source video frame based on the first ratio; encoding the source video frame based on (Continued)

an adjusted quantization parameter to obtain a target video frame; replacing the source video frame with the target video frame to obtain a video sequence after the replacement; and adding the video sequence after the replacement to target video data according to the sequence arrangement order.

17 Claims, 10 Drawing Sheets

(51) Int. Cl.
*H04N 19/172* (2014.01)
*H04N 19/60* (2014.01)

(56) References Cited

U.S. PATENT DOCUMENTS

2017/0359601 A1* 12/2017 Sievers .......... H04N 21/234363
2019/0342551 A1   11/2019 Zhu

FOREIGN PATENT DOCUMENTS

| CN | 107078852 A | 8/2017 |
| CN | 107404648 A | 11/2017 |
| CN | 109168030 A | 1/2019 |

OTHER PUBLICATIONS

The World Intellectual Property Organization (WIPO) International Search Report for PCT/CN2019/090395 dated Jul. 31, 2019 5 Pages (including translation).
The State Intellectual Property Office of the People's Republic of China (SIPO) Office Action 1 for 201811191653.7, dated Jun. 17, 2020 8 Pages (including translation).
Taiwan Intellectual Property Office Examination report for Application No. 108119926 dated Mar. 19, 2020 9 pages (including translation).
Lian Zhang et al. "Fast intra bit rate transcoding for HEVC screen content coding", IET Image Processing, vol. 12, No. 5, Apr. 26, 2018 (Apr. 26, 2018), ISSN: 1751-9659, pp. 738-744 7 pages.

* cited by examiner

VIDEO TRANSCODING METHOD AND DEVICE, AND STORAGE MEDIUM

RELATED APPLICATIONS

This application is a continuation application of PCT Patent Application No. PCT/CN2019/090395, filed on Jun. 6, 2019, which claims priority to Chinese Patent Application No. 201811191653.7, entitled "VIDEO TRANSCODING METHOD AND DEVICE, AND STORAGE MEDIUM" filed with the China National Intellectual Property Administration on Oct. 12, 2018, both of which are incorporated by reference in their entirety.

FIELD OF THE TECHNOLOGY

This application relates to the field of computer technologies, and in particular, to a video transcoding method and device, and a storage medium.

BACKGROUND OF THE DISCLOSURE

With the fast progresses in information technologies, unprecedentedly development has been made in applications of multimedia technologies in a network environment. As an important part of the multimedia technologies, video communication technologies are also greatly developed and applied. Because different videos may use different encoding or compression standards, and specific application scenarios may also be different, when a video file is shared, exchanged, or played among different devices, a video transcoding operation is generally required.

Video transcoding refers to a conversion of a compressed and encoded video stream into a video stream in another format to adapt to different network bandwidths, different terminal processing capabilities, and different user needs. The video transcoding is essentially a process of decoding followed by encoding. The process may involve a conversion between different video formats, for example, a conversion of MPEG-2 or MPEG-4 into H.264, or may involve an adjustment of transcoding parameters such as a bit rate, a resolution, and a frame rate, to make a video generated after the transcoding operation meet specific requirements.

SUMMARY

One aspect of the present disclosure includes a video transcoding method for a video transcoding device. The method includes obtaining a video sequence in source video data, which comprises a plurality of video sequences arranged in a sequence arrangement order; obtaining a source video frame in the video sequence; and obtaining a first ratio of a sum of absolute transformed differences of an initial frame in the video sequence to a bit rate of the video sequence. The method also includes adjusting a quantization parameter of the source video frame based on the first ratio; encoding the source video frame based on an adjusted quantization parameter to obtain a target video frame; replacing the source video frame with the target video frame to obtain a video sequence after the replacement; and adding the video sequence after the replacement to target video data according to the sequence arrangement order.

Another aspect of the present disclosure includes a video transcoding device. The video transcoding device a memory storing computer program instructions, and a processor coupled to the memory. When executing the computer program instructions, the processor is configured to perform: obtaining a video sequence in source video data, the source video data comprising a plurality of video sequences arranged in a sequence arrangement order; obtaining a source video frame in the video sequence; obtaining a first ratio of a sum of absolute transformed differences of an initial frame in the video sequence to a bit rate of the video sequence; adjusting a quantization parameter of the source video frame based on the first ratio; encoding the source video frame based on an adjusted quantization parameter to obtain a target video frame; replacing the source video frame with the target video frame to obtain a video sequence after the replacement; and adding the video sequence after the replacement to target video data according to the sequence arrangement order.

Another aspect of the present disclosure includes a video transcoding device. The video transcoding device include a source video frame obtaining unit, configured to obtain a video sequence in source video data, and obtain a source video frame in the video sequence, the source video data including a plurality of video sequences arranged in a sequence arrangement order; a parameter adjusting unit, configured to obtain a first ratio of a sum of absolute transformed differences of an initial frame in the video sequence to a bit rate of the video sequence, and adjust a quantization parameter of the source video frame based on the first ratio; a video frame encoding unit, configured to encode the source video frame based on an adjusted quantization parameter to obtain a target video frame, and replace the source video frame with the target video frame to obtain a video sequence after the replacement; and a sequence adding unit, configured to add the video sequence after the replacement to target video data according to the sequence arrangement order.

Another aspect of the present disclosure includes a non-transitory computer-readable storage medium. The non-transitory computer-readable storage medium stores computer program instructions executable by at least one processor to perform: obtaining a video sequence in source video data, the source video data comprising a plurality of video sequences arranged in a sequence arrangement order; obtaining a source video frame in the video sequence; obtaining a first ratio of a sum of absolute transformed differences of an initial frame in the video sequence to a bit rate of the video sequence; adjusting a quantization parameter of the source video frame based on the first ratio; encoding the source video frame based on an adjusted quantization parameter to obtain a target video frame; replacing the source video frame with the target video frame to obtain a video sequence after the replacement; and adding the video sequence after the replacement to target video data according to the sequence arrangement order.

Other aspects of the present disclosure can be understood by those skilled in the art in light of the description, the claims, and the drawings of the present disclosure.

DETAILED DESCRIPTION

The following describes the technical solutions in embodiments of the present disclosure with reference to the accompanying drawings. Apparently, the described embodiments are merely some embodiments of the present disclosure rather than all of the embodiments. Based on the disclosed embodiments of the present disclosure, other embodiments obtained by a person skilled in the art without any creative efforts all fall within the protection scope of the present disclosure.

To reduce a quality fluctuation in a video transcoding process, a four-channel encoding technology is used. The four-channel encoding technology refers to a process of separately encoding and multiplexing four channels of video data that is the same as source video data into one channel. For the implementation of encoding of each channel, a current encoding process is implemented according to previous encoding information, that is, an $(i+1)^{th}$ encoding uses information of $i^{th}$ encoding, thereby completing encoding processes of all code blocks in this manner. In this way, with more encoding operations, there is more reference information and less quality loss. However, using the same method to separately encode the four channels of video data inevitably leads to an increase in an encoding time. Therefore, the encoding time complexity is greatly increased while the video quality is guaranteed.

Figure 1:
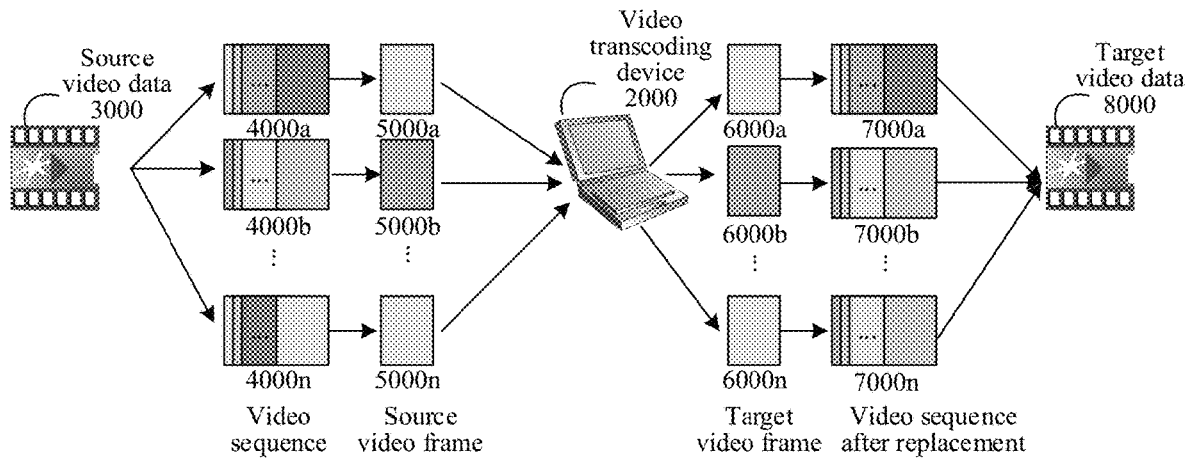
FIG. 1 is a schematic structural diagram of a video transcoding network architecture according to an embodiment of the present disclosure.

FIG. 1 is a schematic structural diagram of a video transcoding network architecture according to an embodiment of the present disclosure. As shown in FIG. 1, the network architecture may include a video transcoding device 2000, source video data 3000, a plurality of video sequences 4000a, 4000b, ..., 4000n corresponding to the source video data 3000, a plurality of source video frames included in each video sequence, such as a plurality of source video frames 5000a included in the video sequence 4000a, a plurality of source video frames 5000b included in the video sequence 4000b, ..., a plurality of source video frames 5000n included in the video sequence 4000n, target video frames 6000a, 6000b, ..., 6000n obtained after the source video frames are processed by the video transcoding device 2000, video sequences 7000a, 7000b, ..., 7000n obtained after the source video frames are replaced with the target video frames, and target video data 8000 obtained by synthesizing the video sequences after the replacement.

The video transcoding device 2000 may be a user terminal, including a terminal device having a video transcoding function, such as a tablet computer, a personal computer (PC), a smartphone, a palmtop computer, or a mobile Internet device (MID), and or may be a terminal application program, such as an applet or APP. The video transcoding device 2000 may further be a server having the video transcoding function.

As shown in FIG. 1, the video transcoding device 2000 obtains source video data 3000 and divides the source video data 3000 into the plurality of video sequences 4000a, 4000b, ..., 4000n. A sequence number set of the plurality of video sequences 4000a, 4000b, ..., 4000n, and a frame number set of each video sequence (such as a plurality of 5000a, a plurality of 5000b, ..., a plurality of 5000n) in the plurality of video sequences 4000a, 4000b, ..., 4000n may be set based on instructions inputted by a user.

The plurality of video sequences 4000a, 4000b, ..., 4000n are arranged in a sequence arrangement order, for example, the sequence numbers are 0, 1, 2, ..., n. Therefore, the plurality of video sequences may be classified as a video sequence (4000a) having a sequence number of 0 and video sequences (4000b, ..., 4000n) having non-zero sequence numbers.

Further, the plurality of source video frames (5000a) in each video sequence (such as 4000a) are numbered, which may be classified as an initial frame, front affected frames, middle affected frames, and rear affected frames. A feasible numbering manner is that the initial frame (the first frame) is a video frame numbered 1, the front affected frames are video frames numbered 2-20, the rear affected frames are video frames from a frame, of which the frame number is a total frame quantity minus 20, to the last frame, and the middle affected frames are based on video frames between the front affected frames and the rear affected frames.

Distributed processing is performed on the video sequences 4000a, 4000b, ..., 4000n in the same manner. For ease of understanding, a processing process of 4000a is used as an example for description.

The video sequence 4000a includes the plurality of source video frames 5000a. Each source video frame is traversed in turn, and a source video frame 5000a currently traversed is obtained.

Moreover, a first ratio seqCpx of a sum of absolute transformed differences of the initial frame in the video sequence 4000a to a bit rate of the video sequence is obtained, and a sequence number of the video sequence in the sequence number set and a frame number of the source video frame in the frame number set are obtained.

When the sequence number is the initial sequence number and the frame number is the initial frame number (the initial frame of the video sequence numbered 0), a quantization parameter Q of the source video frame is adjusted based on the first ratio seqCpx.

When the sequence number is the initial sequence number and the frame number is a front affected frame number, or the sequence number is the initial sequence number and the frame number is a middle affected frame number (a front affected frame or middle affected frame of the video sequence numbered 0), a second ratio picRate of the sum of absolute transformed differences of the source video frame

5000a to the bit rate of the video sequence is obtained; and the quantization parameter Q of the source video frame is adjusted based on the first ratio seqCpx and the second ratio picRate.

When the sequence number is the initial sequence number and the frame number is a rear affected frame number (a rail affected frame of the video sequence numbered 0), the second ratio picRate of the sum of absolute transformed differences of the source video frame 5000a to the bit rate of the video sequence and a third ratio blurRate of image blurriness of the source video frame to the sum of absolute transformed differences of the source video frame are obtained; and the quantization parameter Q of the source video frame is adjusted based on the first ratio seqCpx, the second ratio picRate, and the third ratio blurRate.

When the sequence number is a non-initial sequence number and the frame number is the initial frame number (the initial frame of a video sequence not numbered 0), the second ratio picRate of the sum of absolute transformed differences of the source video frame 5000a to the bit rate of the video sequence and the third ratio blurRate of the image blurriness of the source video frame to the sum of absolute transformed differences of the source video frame are obtained; and the quantization parameter Q of the source video frame is adjusted based on the first ratio seqCpx, the second ratio picRate, and the third ratio blurRate.

When the sequence number is a non-initial sequence number and the frame number is a front affected frame number; or the sequence number is a non-initial sequence number and the frame number is a middle affected frame number, or the sequence number is a non-initial sequence number and the frame number is a rear affected frame number (a front affected frame, or a middle affected frame or a rear affected frame of a video sequence not numbered 0), the second ratio picRate of the sum of absolute transformed differences of the source video frame 5000a to the bit rate of the video sequence and the third ratio blurRate of the image blurriness of the source video frame to the sum of absolute transformed differences of the source video frame are obtained, and a fourth ratio i_blurRate of image blurriness of the initial frame in the video sequence to the sum of absolute transformed differences of the initial frame is obtained; and the quantization parameter Q of the source video frame is adjusted based on the first ratio seqCpx, the second ratio picRate, the third ratio blurRate, and the fourth ratio i_blurRate.

After Q value is adjusted for the foregoing situations respectively, the source video frame 5000a is encoded based on an adjusted quantization parameter Q to obtain a target video frame 6000a, and the source video frame 5000a is replaced with the target video frame 6000a to obtain a video sequence 7000a after the replacement; and the video sequence 7000a after the replacement is added to target video data 8000 according to a sequence arrangement order.

The same processing is separately performed on 4000b, ..., 4000n in the foregoing manner. Therefore, the target video frame 8000 is obtained to complete the video transcoding process.

The following describes a video transcoding method provided in the embodiments of the present disclosure in detail with reference to FIG. 2 to FIG. 10. A video transcoding device in the embodiments of the present disclosure may be the video transcoding device 2000 shown in FIG. 1.

Figure 2:
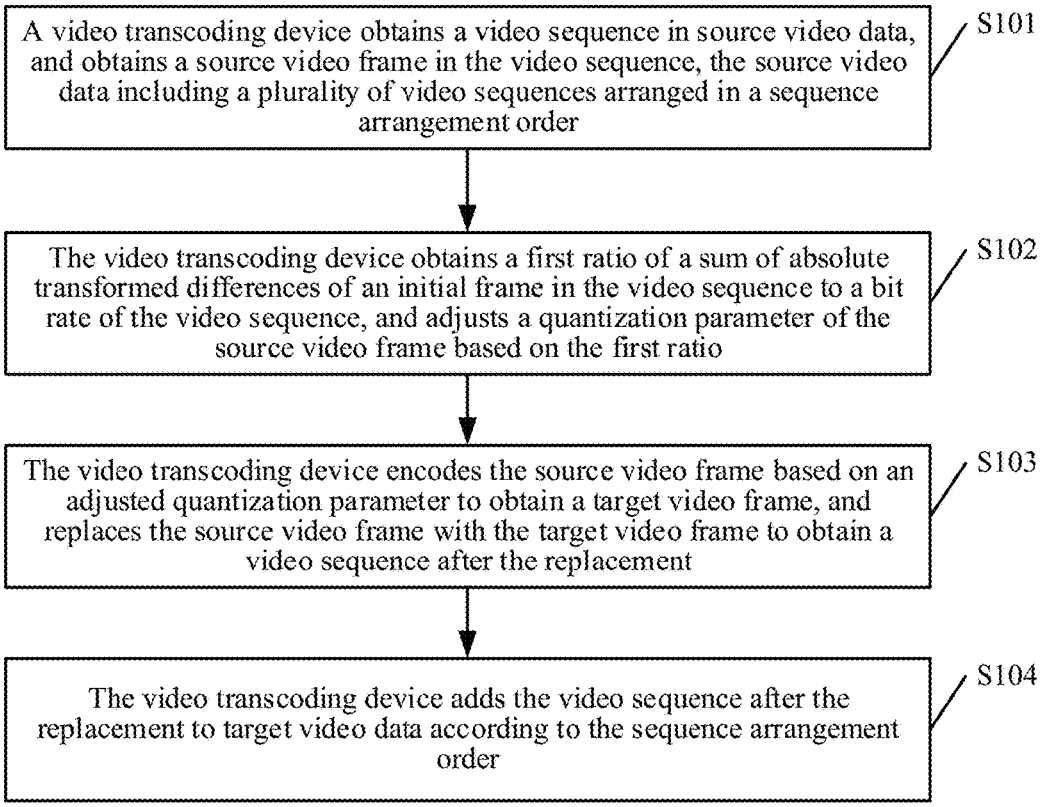
FIG. 2 is a schematic flowchart of a video transcoding method according to an embodiment of the present disclosure.

FIG. 2 is a schematic flowchart of a video transcoding method according to an embodiment of the present disclosure. As shown in FIG. 2, the video transcoding method may include the following S101 to S104.

S101. The video transcoding device obtains a video sequence in source video data, and obtains a source video frame in the video sequence, the source video data including a plurality of video sequences arranged in a sequence arrangement order.

The video data may refer to an image stream composed of a plurality of frames of images, which is essentially composed of groups of consecutive images, and has abundant information and content. The information can be intuitively, vividly, truthfully and efficiently expressed when conveyed in a form of a video. The amount of information conveyed is abundant.

The video data is divided according to a preset number of image frames, to obtain a plurality of video sequences. Each video sequence includes a plurality of frames of images. A frame is the smallest visual unit forming a video and is an image.

In one embodiment of the present disclosure, the obtained video data is used as source video data and the source video data includes the plurality of video sequences. The plurality of video sequences are arranged in a sequence arrangement order. Each video sequence includes a plurality of source video frames. The plurality of source video frames are arranged in a frame arrangement order.

Specifically, the video transcoding device obtains the source video data by capturing to-be-transcoded source video data in a video data set, or receiving to-be-transcoded source video data transmitted from another device (user terminal), or downloading to-be-transcoded source video data from the Internet, or currently recording to-be-recorded source video data, and divides the source video data into a plurality of continuous video sequences by using a specified segmentation rule. The plurality of video sequences may be separately traversed in a distributed manner to obtain the source video frame in the video sequence that is currently traversed. The segmentation rule may be dividing in sequence according to a specified number of frames, for example, every 30 frames are grouped as a video sequence.

S102. The video transcoding device obtains a first ratio of a sum of absolute transformed differences of an initial frame in the video sequence to a bit rate of the video sequence, and adjusts a quantization parameter of the source video frame based on the first ratio.

A plurality of frames of images may be included in the video sequence and the sum of absolute transformed differences (SATD) of the initial frame image is obtained. The SATD is a measure of a size of a video residual signal. If the predicted value is close to a current actual value, the difference (referred to as a prediction residual) between the predicted value and the current actual value is small enough. Therefore, encoding is performed by an encoder through a short codeword.

The bit rate of the video sequence refers to a total bit rate of all frames in the video sequence, that is, data bits transmitted per unit time during data transmission. The unit is kilobits per second (kbps). The bit rate is commonly interpreted as a sampling rate. A higher sampling rate in a unit time indicates a higher precision, so that a processed file is more similar to an original file.

Therefore, the first ratio=the sum of absolute transformed differences of the initial frame of image/the bit rate of the video sequence.

In the video transcoding process, image lossy compression encoding is often used. Because the image lossy compression encoding takes the advantage of human insensitivity to certain frequency components in images or sound waves, allowing loss of certain information in a compression process. The original data cannot be completely restored, but the impact of the lost part on understanding the original image is reduced and the compression rate is relatively high. Quantization is an important step in the lossy compression encoding process. The quantization is a process of mapping a continuous value of a signal into a plurality of discrete amplitudes, thereby implementing a many-to-one mapping of the signal value. A value range of the signal may be effectively reduced through the quantization, thereby obtaining a better compression effect. Therefore, to reduce a quality fluctuation (information loss) in the video transcoding process, the quantization parameter in the transcoding may be adjusted, and an adjusted quantization parameter may be used for the lossy compression encoding. In one embodiment of the present disclosure, the quantization parameter in the encoding process may be adjusted based on the first ratio.

The video transcoding refers to a conversion of a compressed and encoded video stream into another video stream to adapt to different network bandwidth formats (such as a compatible, standard definition, high definition, or super high definition format), different terminal processing capabilities, and different user needs. The video transcoding is essentially a process of decoding followed by encoding.

The encoding is a process of converting information from one form or format to another form. Characters, numbers, or other objects are encoded into digits by using a predetermined method, or information and data are converted into a specified electrical pulse signal. Decoding is a reverse process of encoding.

Specifically, because a plurality of video sequences of source video data are arranged in a sequence arrangement order, each video sequence corresponds to a sequence number to form a sequence number set. The each video sequence further includes a plurality of frames of images. Each image corresponds to a frame number to form a frame number set. Each sequence number set includes an initial sequence number and non-initial sequence numbers. The frame number set includes an initial frame number, front affected frame numbers, middle affected frame numbers, and rear affected frame numbers.

Specifically, the quantization parameter is mainly adjusted according to two situations: a video sequence numbered 0 and a non-zero video sequence.

When the sequence number is the initial sequence number and the frame number is the initial frame number, a quantization parameter of the source video frame is adjusted based on the first ratio.

When the sequence number is the initial sequence number and the frame number is a front affected frame number, or the sequence number is the initial sequence number and the frame number is a middle affected frame number, a second ratio of the sum of absolute transformed differences of the source video frame to the bit rate of the video sequence is obtained; and the quantization parameter of the source video frame is adjusted based on the first ratio and the second ratio.

When the sequence number is the initial sequence number and the frame number is a rear affected frame number, the second ratio of the sum of absolute transformed differences of the source video frame to the bit rate of the video sequence and a third ratio of image blurriness of the source video frame to the sum of absolute transformed differences of the source video frame are obtained; and the quantization parameter of the source video frame is adjusted based on the first ratio, the second ratio, and the third ratio.

When the sequence number is a non-initial sequence number and the frame number is the initial frame number, the second ratio of the sum of absolute transformed differences of the source video frame to the bit rate of the video sequence and the third ratio of the image blurriness of the source video frame to the sum of absolute transformed differences of the source video frame are obtained; and the quantization parameter of the source video frame is adjusted based on the first ratio, the second ratio, and the third ratio.

When the sequence number is a non-initial sequence number and the frame number is a front affected frame number; or the sequence number is a non-initial sequence number and the frame number is a middle affected frame number, or the sequence number is a non-initial sequence number and the frame number is a rear affected frame number, the second ratio of the sum of absolute transformed differences of the source video frame to the bit rate of the video sequence and the third ratio of the image blurriness of the source video frame to the sum of absolute transformed differences of the source video frame are obtained, and a fourth ratio of image blurriness of the initial frame in the video sequence to the sum of absolute transformed differences of the initial frame is obtained; and the quantization parameter of the source video frame is adjusted based on the first ratio, the second ratio, the third ratio, and the fourth ratio.

S103. The video transcoding device encodes the source video frame based on an adjusted quantization parameter to obtain a target video frame, and replaces the source video frame with the target video frame to obtain a video sequence after the replacement.

It may be understood that the quantization is a key link in the lossy compression encoding. A good quantization effect requires not only good rate-distortion (R-D) performance, but also good subjective quality of a reconstructed image. In one embodiment of the present disclosure, the quantization is optimized is by adjusting the quantization parameter QP(Q).

The quantization parameter Q is a sequence number of a quantization step Qstep. For luma encoding, the quantization step Qstep has 52 values, and a value range of QP is 0 to 51. For chroma encoding, a value range of Q is 0 to 39.

Specifically, the source video frame is encoded by using the adjusted quantization parameter. After the encoding is completed, a target video frame is obtained. The target video frame is directly used to replace the original source video frame, and all the source video frames in the video sequence are replaced in the same manner, thereby obtaining a video sequence after the replacement. The video sequence after the replacement is a video sequence obtained after encoding.

S104. The video transcoding device adds the video sequence after the replacement to target video data according to the sequence arrangement order.

The encoded video sequences are re-spliced according to the sequence arrangement order, thereby obtaining encoded target video data and completing the video transcoding process.

In one embodiment of the present disclosure, a video sequence in a plurality of video sequences arranged in a sequence arrangement order in source video data is obtained, and a source video frame in the video sequence is obtained; then a first ratio of a sum of absolute transformed differences of an initial frame in the video sequence to a bit rate of the video sequence is calculated, and a quantization parameter of the source video frame is adjusted based on the first ratio; the source video frame is encoded based on an adjusted quantization parameter to obtain a target video frame; the source video frame is replaced with the target video frame to obtain a video sequence after the replacement; and the video sequence after the replacement is added to target video data according to the sequence arrangement order. All the video sequences are processed in the same manner, thereby implementing the video transcoding process. The quantization parameter of each source video frame in each video sequence is adjusted based on the first ratio of the sum of absolute transformed differences of the initial frame in the video sequence to the bit rate of the video sequence, and encoding is performed by using the adjusted quantization parameter, to reduce the quality jitter in the video transcoding process. It is unnecessary to perform four-channel encoding. The encoding method is simple and fast, thereby reducing the encoding time complexity.

Figure 3:
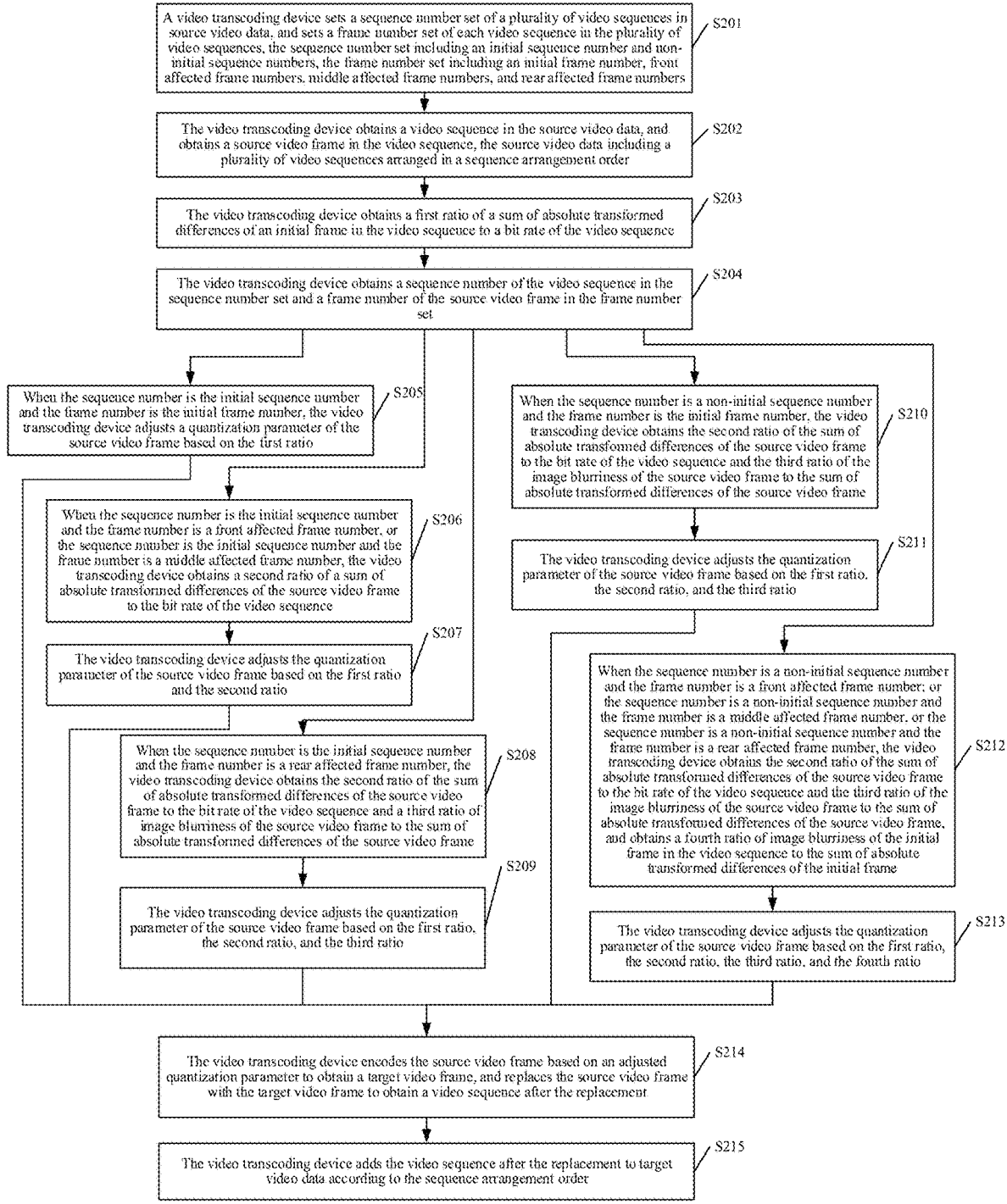
FIG. 3 is a schematic flowchart of a video transcoding method according to an embodiment of the present disclosure.

FIG. 3 is a schematic flowchart of a video transcoding method according to an embodiment of the present disclosure. As shown in FIG. 3, the video transcoding method may include the following S201 to S215.

S201. A video transcoding device sets a sequence number set of a plurality of video sequences in source video data, and sets a frame number set of each video sequence in the plurality of video sequences, the sequence number set including an initial sequence number and non-initial sequence numbers, and the frame number set including an initial frame number, front affected frame numbers, middle affected frame numbers, and rear affected frame numbers.

The video data is divided according to a preset number of image frames, to obtain a plurality of video sequences. Each video sequence includes a plurality of frames of images. A frame is the smallest visual unit that forms a video and is an image. For example, a feasible division manner is videoWriter writer('out.avi', cv2.cv.CV_FOURCC('M', 'J', 'P', 'G'), fps, size, 0/1). The first parameter is a written video sequence name, the second parameter is an encoding format of the video sequence, the third parameter is a frame rate, the fourth parameter is a size of the video sequence, and the last parameter is a color image saved by default if the parameter is 1, and if not, the last parameter is decided depends on the video color.

In one embodiment of the present disclosure, obtained video data is used as source video data. The source video data includes a plurality of video sequences. The plurality of video sequences are numbered, and one video sequence corresponds to one sequence number, thereby obtaining a sequence number set $\{0, 1, 2, \ldots, n\}$ corresponding to the source video data. Then the plurality of video sequences may be divided into a video sequence having a sequence number of 0 and video sequences having non-zero sequence numbers.

Each video sequence further includes a plurality of source video frames. The plurality of source video frames in the each video sequence are numbered, and may be divided as an initial frame, front affected frames, middle affected frames, and rear affected frames. A feasible numbering manner is that the initial frame (the first frame) is a video frame numbered 1, the front affected frames are video frames numbered 2-20, the rear affected frames are video frames from a frame, of which the frame number is a total frame number minus 20, to the last frame, and the middle affected frames are based on video frames between the front affected frames and the rear affected frames.

Figure 4:
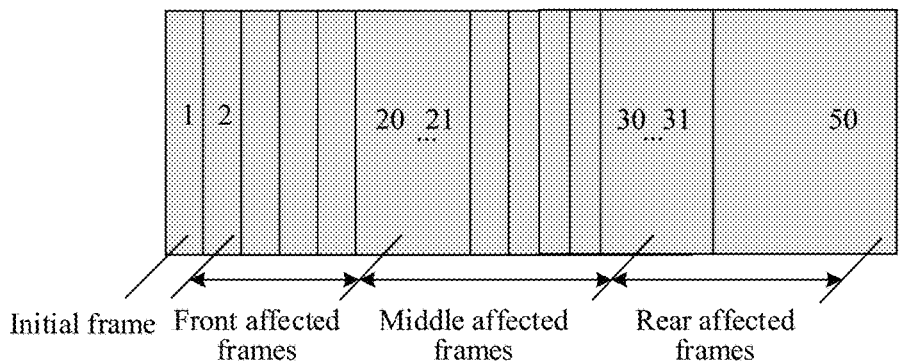
FIG. 4 is a schematic structural diagram of composition of a video sequence according to an embodiment of the present disclosure.

For example, FIG. 4 is a schematic structural diagram of a video sequence. It is assumed that the video sequence includes 50 frames. The $1^{st}$ frame is the initial frame, the $2^{nd}$ to $20^{th}$ frames are the front affected frames, the $21^{st}$ to $30^{th}$ frames are the middle affected frames, and the $31^{st}$ to $50^{th}$ frames are the rear affected frames.

S202. The video transcoding device obtains a video sequence in the source video data, and obtains a source video frame in the video sequence, the source video data including a plurality of video sequences arranged in a sequence arrangement order.

Specifically, the video transcoding device sequentially traverses the video sequences and obtains a video sequence that is currently traversed, and then traverses source video frames in the video sequence and obtains a source video frame that is currently traversed.

For example, if the source video data includes 10 video sequences, when the first video sequence (for example, a video sequence numbered 0) is currently traversed, the first video sequence includes 50 source video frames, and the first frame (initial frame) is currently traversed, video information of the frame is read.

S203. The video transcoding device obtains a first ratio of a sum of absolute transformed differences of an initial frame in the video sequence to a bit rate of the video sequence.

It may be understood that the sum of absolute transformed differences (SATD) is a measure of a size of a video residual signal. If the predicted value is close to a current actual value, the difference (referred to as a prediction residual) between the predicted value and the current actual value is small enough. Therefore, encoding is performed by an encoder through a short codeword.

The bit rate of the video sequence refers to a total bit rate of all frames in the video sequence, that is, data bits transmitted per unit time during data transmission. The unit is kilobits per second (kbps). The bit rate is commonly interpreted as a sampling rate. A higher sampling rate in a unit time indicates a higher precision, so that a processed file is more similar to an original file. A code stream refers to the total bit rate of all the source video frames in the video sequence.

Therefore, the first ratio seqCpx=the SATD of the initial frame of image/the bit rate of the video sequence.

Typical lossy compression encoding technologies include: predictive encoding, which reduces the correlation of data in space and time to achieve the purpose of data compression, for example, point-linear prediction, intra prediction, and inter prediction; transform encoding, which transforms an image domain signal to a frequency domain for processing, for example, karhunen-loeve (KL) transform, discrete Fourier transform (DFT), discrete cosine transform (DCT), discrete sine transform (DST), hardamard transform, and wavelet transform; quantization encoding, where during digitization of an analog signal, a quantization process is needed, the design of a quantizer is a critical step, and the quality of the quantizer has direct impact on the quantization error, for example, scalar quantization and vector quantization; and sub-band encoding, which mainly includes two manners, where one manner is that after image data is transformed into the frequency domain and is stripped according to the frequency domain, different quantizers are used for quantization to achieve an optimal combination; the other manner is step by step progressive encoding, where initially, a signal in a certain frequency band is decoded, and then signals of all frequency bands are gradually decoded; as decoded data increases, a decoded image gradually becomes clearer, for example, sub-band encoding and a block cutting method; and model encoding, for example, a structural model and a knowledge base model. The structural model encoding means that during encoding, structural characteristic parameters such as boundary, contour, and texture in the image are first obtained, and then parameter information is saved. During decoding, combination is performed according to the structure and the parameter information to restore an original image. In the knowledge base model encoding, for images that can be described by rules such as human faces, people's knowledge about such images is used to form a rule library, and features such as face variations are described by using some parameters accordingly, so that image encoding and decoding of human faces may be implemented according to the parameters and the model. Hybrid encoding means using at least two encoding methods at the same time for encoding, for example, JPEG, H.261, MPEG and the like.

S204. The video transcoding device obtains a sequence number of the video sequence in the sequence number set and a frame number of the source video frame in the frame number set.

Specifically, the sequence number of the currently traversed video sequence and the frame number of the current source video frame of the video sequence are obtained, so that a quality parameter adjustment method corresponding the obtained sequence number and frame number is used.

Quantization is a step in the lossy compression encoding process. The quantization is a process of mapping continuous value of a signal into a plurality of discrete amplitudes, thereby implementing a many-to-one mapping of the signal value. A value range of the signal may be effectively reduced through the quantization, thereby obtaining a better compression effect. Therefore, to reduce an information loss in the video transcoding process, the quantization parameter in the transcoding may be adjusted. In one embodiment of the present disclosure, the quantization parameter in the encoding process may be adjusted based on the first ratio.

The encoding is a process of converting information from one form or format to another form. Characters, numbers, or other objects are encoded into digits by using a predetermined method, or information and data are converted into a specified electrical pulse signal. Decoding is a reverse process of encoding.

S205. When the sequence number is the initial sequence number and the frame number is the initial frame number, the video transcoding device adjusts a quantization parameter of the source video frame based on the first ratio.

Figure 5:
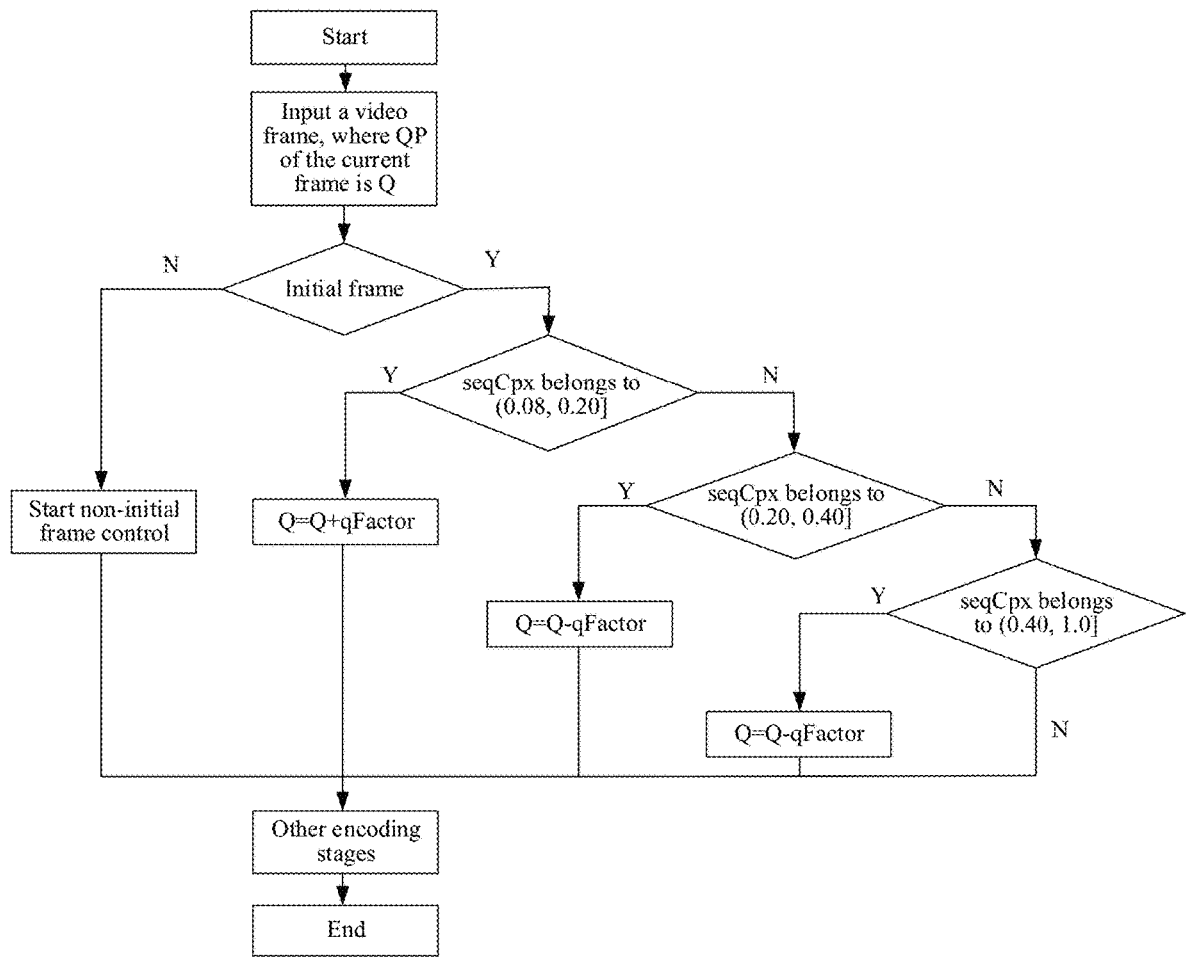
FIG. 5 is a schematic diagram of a process of adjusting a quantization parameter according to an embodiment of the present disclosure.

It may be understood that when the sequence number is the initial sequence number and the frame number is the initial frame number, it indicates that the source video frame is the initial frame of the video sequence numbered 0. The first ratio seqCpx can effectively identify an adjustment trend of the quantization parameter of the current subsequence. The quantization parameter of the source video frame may be adjusted based on the first ratio seqCpx. Refer to FIG. 5 for the specific adjustment process.

Table 1 below shows a distribution of seqCpx. Specifically, a system allocates an initial quantization parameter QP for each source video frame. When it is determined that the current source video frame is the initial frame of the sequence numbered 0, a range to which seqCpx belongs is looked up based on Table 1. If seqCpx belongs to (0.08, 0.20] interval, the quantization parameter Q is adjusted to Q=Q+qFactor, qFactor=seqCpx*10. Otherwise, if seqCpx belongs to (0.20, 0.40] interval, the quantization parameter Q is adjusted to Q=Q−qFactor. Otherwise, if seqCpx belongs to (0.40, 1.0] interval, the quantization parameter Q is adjusted to Q=Q−qFactor. After the adjustment is completed, other stages of the encoding process are performed to complete the video transcoding process. Certainly, if the current source video frame is not the initial frame of the sequence numbered, a quantization parameter adjustment method corresponding to the non-initial frame is used for adjustment.

TABLE 1

| seqCpx of the initial frame of the video sequence numbered 0 | seqCpx of the initial frame of the video sequence not numbered 0 |
| --- | --- |
| (0.08, 0.20] | (0.0, 0.07] |
| (0.20, 0.40] | (0.10, 0.12] |
| (0.40, 1.0] | (0.12, 0.20] |
|  | (0.20, 0.30] |

S206. When the sequence number is the initial sequence number and the frame number is a front affected frame number, or the sequence number is the initial sequence number and the frame number is a middle affected frame number, the video transcoding device obtains a second ratio of a sum of absolute transformed differences of the source video frame to the bit rate of the video sequence.

It may be understood that when the sequence number is the initial sequence number and the frame number is a front affected frame number, or the sequence number is the initial sequence number and the frame number is a middle affected frame number, it indicates that the source video frame is a front affected frame or a middle affected frame of the video sequence numbered 0, the second ratio picRate=SATD of the current source video frame image/the bit rate of the video sequence is calculated, and the quantization parameter of the source video frame is adjusted based on the first ratio seqCpx and the second ratio picRate.

S207. The video transcoding device adjusts the quantization parameter of the source video frame based on the first ratio and the second ratio.

In one embodiment, the distribution of seqCpx may further include a plurality of sub-intervals, such as (0.07, 0.40], (0.07, 0.15], (0.01, 0.06], (0.20, 0.40], and the like.

Figure 6:
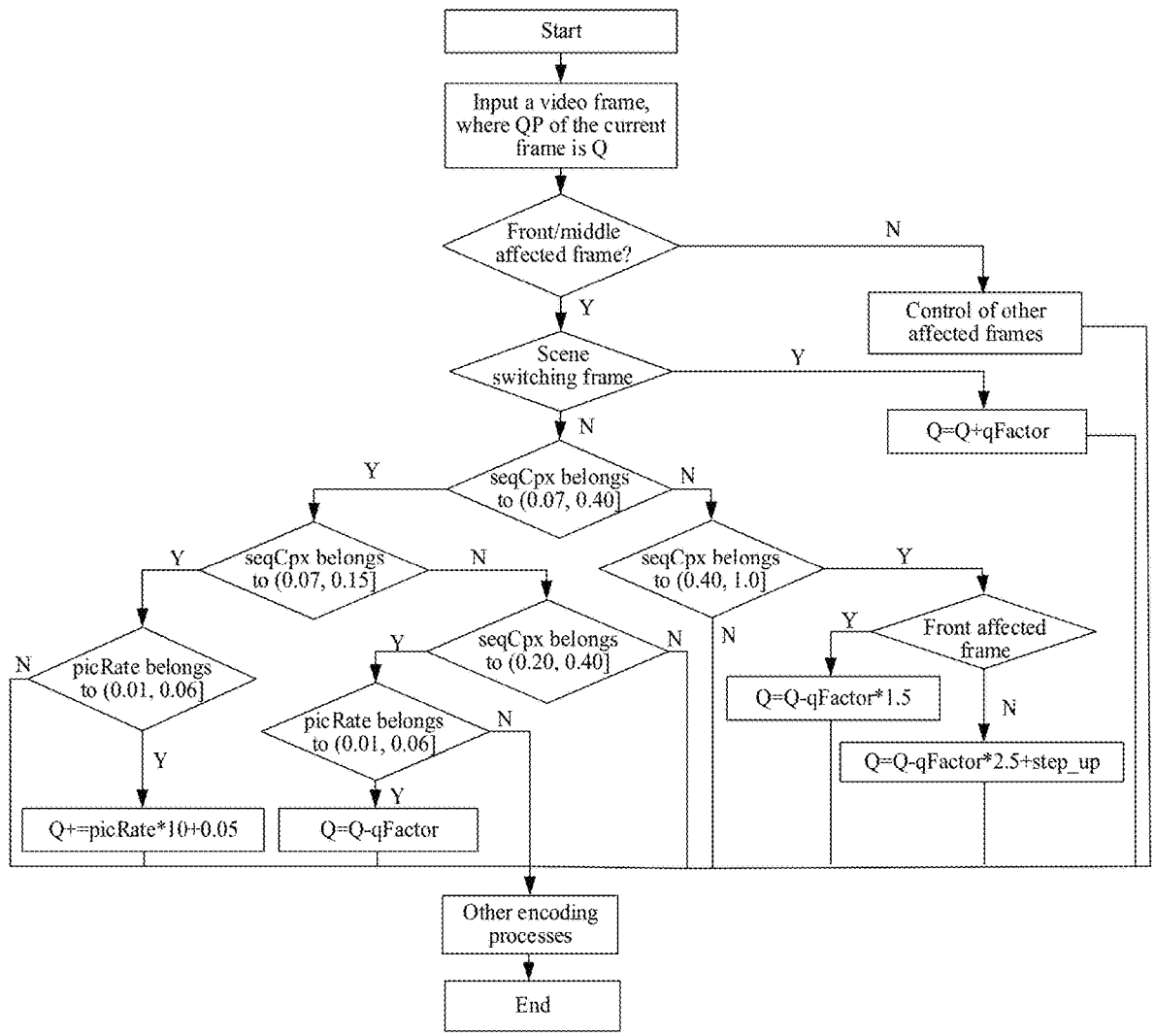
FIG. 6 is a schematic diagram of a process of adjusting a quantization parameter according to an embodiment of the present disclosure.

The specific adjustment process is shown in FIG. 6. When it is determined that the current source video frame is a front affected frame or a middle affected frame of the sequence numbered 0, it is determined whether the source video frame is a scene switching frame. Specifically, the determination may be performed based on a scene flag in the encoder.

If the source video frame is a scene switching frame, the quantization parameter Q is adjusted to Q=Q+qFactor, qFactor=seqCpx*10.

If the source video frame is not a scene switching frame, an interval to which seqCpx belongs is determined. If seqCpx belongs to (0.07, 0.40] interval, then it is further determined whether seqCpx belongs to (0.07, 0.15] interval. If seqCpx belongs to (0.07, 0.15] interval, and picRate belongs to (0.01, 0.06] interval, the quantization parameter Q is adjusted to Q+=picRate*10+0.05.

If the source video frame is not a scene switching frame, and seqCpx belongs to (0.07, 0.40] interval, it is further determined whether seqCpx belongs to (0.07, 0.15] interval. If seqCpx does not belong to (0.07, 0.15] interval, it is further determined whether seqCpx belongs to (0.20, 0.40] interval. If seqCpx belongs to (0.20, 0.40] interval and picRate belongs to (0.01, 0.06] interval, the quantization parameter Q is adjusted to Q=Q−qFactor.

If the source video frame is not a scene switching frame, and seqCpx belongs to (0.07, 0.40] interval, it is further determined whether seqCpx belongs to (0.07, 0.15] interval. If seqCpx does not belong to (0.07, 0.15] interval, it is further determined whether seqCpx belongs to (0.20, 0.40] interval. If seqCpx belongs to (0.20, 0.40] interval and picRate does not belong to (0.01, 0.06] interval, other stages of the encoding process are performed to complete the video transcoding process.

If the source video frame is not a scene switching frame and seqCpx does not belong to (0.07, 0.40] interval, it is further determined whether seqCpx belongs to (0.40, 1.0] interval. If seqCpx belongs to (0.40, 1.0] interval, and the source video frame is a front affected frame, the quantization parameter Q is adjusted to Q=Q−qFactor*1.5.

If the source video frame is not a scene switching frame and seqCpx does not belong to (0.07, 0.40] interval, it is further determined whether seqCpx belongs to (0.40, 1.0] interval. If seqCpx belongs to (0.40, 1.0] interval, and the source video frame is not a front affected frame (that is, the source video frame is a middle affected frame), the quantization parameter Q is adjusted to Q=Q−qFactor*2.5+ step_up, where step_up is a dynamic effect factor, which changes with the frames, and has an initial value of 0.01 and an upper limit of 4.

Certainly, if the current source video frame is not a front affected frame or a middle affected frame, a quantization parameter adjustment method corresponding to other affected frames is used for adjustment.

S208. When the sequence number is the initial sequence number and the frame number is a rear affected frame number, the video transcoding device obtains the second ratio of the sum of absolute transformed differences of the source video frame to the bit rate of the video sequence and a third ratio of image blurriness of the source video frame to the sum of absolute transformed differences of the source video frame.

It may be understood that when the sequence number is the initial sequence number and the frame number is a rear affected frame number, it indicates that the source video frame is a rear affected frame of the video sequence numbered 0, the second ratio picRate=SATD of the current source video frame image/the bit rate of the video sequence and the third ratio blurRate=the image blurriness of the current source video frame image/SATD of the current source video frame image are calculated.

Because the image blurriness changes in the video transcoding process, which affects the video quality, to reduce the video quality fluctuation in the video transcoding process, the video transcoding process is optimized in one embodiment of the present disclosure.

The image blurriness is also referred to as image definition. The image definition refers to a degree of clearness of detailed shadow lines and boundaries thereof on the image. A main method for measuring the image blurriness is gradient statistical characteristics. Generally, a higher gradient value indicates more abundant edge information of the image and a higher degree of clearness of the image.

Factors that affect the definition of the video includes: format, where a file of AVI format is the largest, which is nearly 10 times larger than that of WMV and 15 times larger than that of MPWG-1, and a file of an FLV format is the smallest. Similarly, the AVI format has the highest degree of clearness, the MPEG has a relatively low degree of clearness, and the FLV format has the lowest degree of clearness. The second factor is the resolution of the video: a larger resolution indicates that the video is clearer. The third factor is a bit degree of the video: a higher bit degree indicates that the video is clearer. Therefore, if the AVI format is converted to FLV format, the definition is reduced. If the resolution is set smaller than the original, the bit rate of the video is also reduced.

Figure 7:
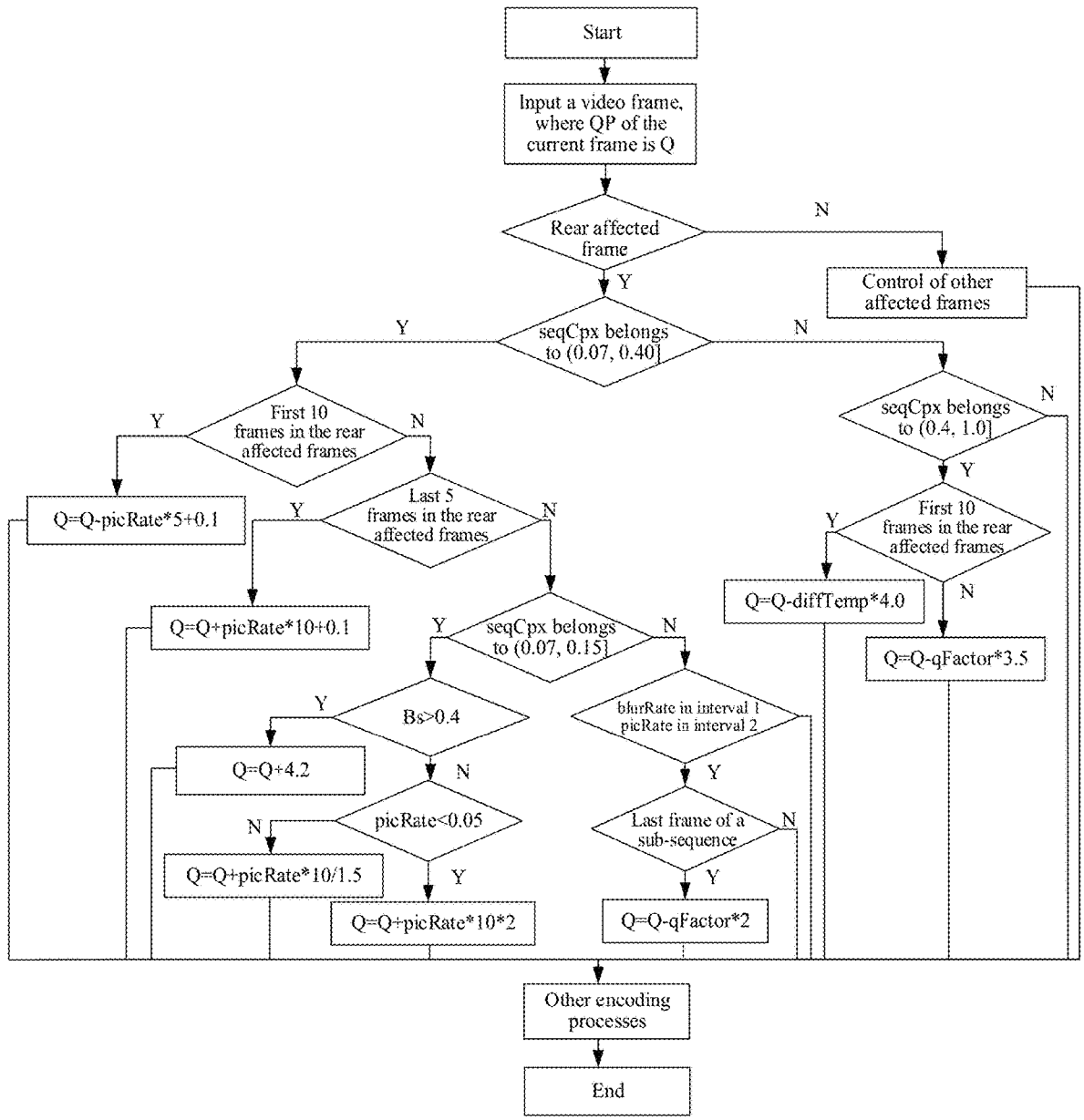
FIG. 7 is a schematic diagram of a process of adjusting a quantization parameter according to an embodiment of the present disclosure.

S209. The video transcoding device adjusts the quantization parameter of the source video frame based on the first ratio, the second ratio, and the third ratio. Refer to FIG. 7 for the specific adjustment process.

In one embodiment, the distribution of seqCpx may further include a plurality of sub-intervals, such as (0.07, 0.15], (0.07, 0.4], and (0.4, 1.0].

When it is determined that the current source video frame is a rear affected frame in the sequence numbered 0, if seqCpx belongs to (0.07, 0.40] interval, and the current source video frame belongs to the first 10 frames of the rear affected frames, the quantization parameter Q is adjusted to Q=Q−picRate*5+0.1.

When it is determined that the current source video frame is a rear affected frame in the sequence numbered 0, if seqCpx belongs to (0.07, 0.40] interval, and the current source video frame belongs to the last 5 frames of the rear affected frames, the quantization parameter Q is adjusted to Q=Q+picRate*10+0.1.

When it is determined that the current source video frame is a rear affected frame in the sequence numbered 0, if seqCpx belongs to (0.07, 0.40] interval, and the current source video frame belongs to neither the first 10 frames of the rear affected frames nor the last 5 frames of the rear affected frames, it is further determined whether seqCpx belongs to (0.07, 0.15] interval. If seqCpx belongs to (0.07, 0.15] interval and Bs>0.4, the quantization parameter Q is adjusted to Q=Q+4.2.

When it is determined that the current source video frame is a rear affected frame in the sequence numbered 0, if seqCpx belongs to (0.07, 0.40] interval, and the current source video frame belongs to neither the first 10 frames of the rear affected frames nor the last 5 frames of the rear affected frames, it is further determined whether seqCpx belongs to (0.07, 0.15] interval. If seqCpx belongs to (0.07, 0.15] interval and Bs<=0.4, it is further determined whether picRate is smaller than 0.05. If picRate>=0.05, the quantization parameter Q is adjusted to Q=Q+picRate*10/1.5. The Bs is the difference between a YUV PSNR value of a previous frame of the current source video frame and a YUV PSNR value of the current source video frame in 1 pass encoding information.

When it is determined that the current source video frame is a rear affected frame in the sequence numbered 0, if seqCpx belongs to (0.07, 0.40] interval, and the current source video frame belongs to neither the first 10 frames of the rear affected frames nor the last 5 frames of the rear affected frames, it is further determined whether seqCpx belongs to (0.07, 0.15] interval. If seqCpx belongs to (0.07, 0.15] interval and Bs<=0.4, it is further determined whether picRate is smaller than 0.05. If picRate<0.05, the quantization parameter Q is adjusted to Q=Q+picRate*10*2. The Bs is a difference between a YUV PSNR value of a previous frame of the current source video frame and a YUV PSNR value of the current source video frame in 1 pass encoding information.

When it is determined that the current source video frame is a rear affected frame in the sequence numbered 0, if seqCpx belongs to (0.07, 0.40] interval, and the current source video frame belongs to neither the first 10 frames of the rear affected frames nor the last 5 frames of the rear affected frames, it is further determined whether seqCpx belongs to (0.07, 0.15] interval. If seqCpx does not belong to (0.07, 0.4] interval, it is further determined whether blurRate belongs to (0.8, 1.0) and whether picRate belongs to (0.07, 0.10). If blurRate belongs to (0.8, 1.0) and picRate belongs to (0.07, 0.10), and the current source video frame is the last frame of the rear affected frames, the quantization parameter Q is adjusted to Q=Q−qFactor*2, qFactor=seqCpx*10.

When it is determined that the current source video frame is a rear affected frame in the sequence numbered 0, if seqCpx does not belong to (0.07, 0.40] interval, but belongs to (0.4, 1.0] interval, and the current source video frame belongs to the first 10 frames of the rear affected frames, the quantization parameter Q is adjusted to Q=Q−diffTemp*4.0, where diffTemp represents an absolute value of a difference between a YUV PSNR value of a previous encoded frame of the current source video frame and a YUV PSNR value of the current source video frame in 1 pass encoding.

When it is determined that the current source video frame is a rear affected frame in the sequence numbered 0, if seqCpx does not belong to (0.07, 0.40] interval, but belongs to (0.4, 1.0] interval, and the current source video frame does not belong to the first 10 frames of the rear affected frames, the quantization parameter Q is adjusted to Q=Q−qFactor*3.5.

After the adjustment is completed, other stages of the encoding process are performed to complete the video transcoding process. Certainly, if the current source video frame is not a rear affected frame in the sequence numbered 0, a quantization parameter adjustment method corresponding to other affected frames is used for adjustment.

S210. When the sequence number is a non-initial sequence number and the frame number is the initial frame number, the video transcoding device obtains the second ratio of the sum of absolute transformed differences of the source video frame to the bit rate of the video sequence and the third ratio of the image blurriness of the source video frame to the sum of absolute transformed differences of the source video frame.

For details of obtaining the second ratio picRate and the third ratio blurRate, refer to S208. Details are not described herein again.

Figure 8:
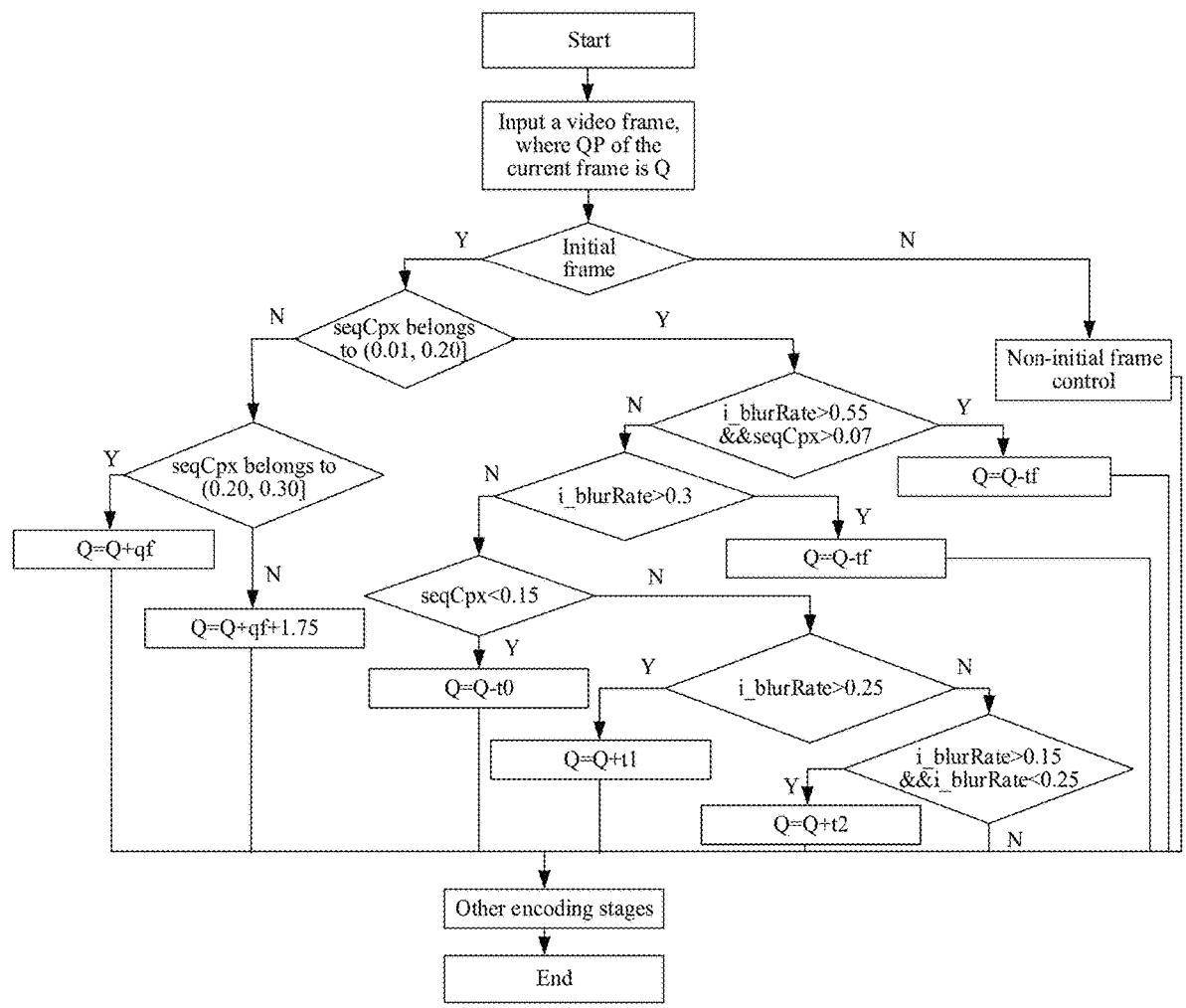
FIG. 8 is a schematic diagram of a process of adjusting a quantization parameter according to an embodiment of the present disclosure.

S211. The video transcoding device adjusts the quantization parameter of the source video frame based on the first ratio, the second ratio, and the third ratio. Refer to FIG. 8 for a specific adjustment process.

In one embodiment, the distribution of seqCpx may further include a plurality of sub-intervals, such as (0.20, 0.30], (0.01, 0.20], and (0.01, 0.20].

When it is determined that the current source video frame is the initial frame of a sequence not numbered 0, if seqCpx does not belong to (0.01, 0.20] interval, but belongs to (0.20, 0.30] interval, the quantization parameter Q is adjusted to Q=Q+qf, qf=(seqCpx*100)/2.2.

When it is determined that the current source video frame is the initial frame of a sequence not numbered 0, if seqCpx neither belongs to (0.01, 0.20] interval nor belongs to (0.20, 0.30] interval, the quantization parameter Q is adjusted to Q=Q+qf+1.75.

When it is determined that the current source video frame is the initial frame of a sequence not numbered 0, if seqCpx belongs to (0.01, 0.20] interval, it is further determined whether i_blurRate>0.55&&seqCpx>0.07. If not, it is then determined whether i_blurRate>0.3. If not, and seqCpx<0.15, the quantization parameter Q is adjusted to Q=Q−t0, t0=qt+pow(avg_psnryuv, 1.0/5)+SSID/3, qt=seqCpx*10.

When it is determined that the current source video frame is the initial frame of a sequence not numbered 0, if seqCpx belongs to (0.01, 0.20] interval, it is further determined whether i_blurRate>0.55&&seqCpx>0.07. If not, it is then determined whether i_blurRate>0.3. If not, and seqCpx>=0.15, it is further determined whether i_blurRate>0.25. If yes, the quantization parameter Q is adjusted to Q=Q+t1, t1=qt+pow(avg_psnryuv, 1.0/5)−1.0, qt=seqCpx*10.

When it is determined that the current source video frame is the initial frame of a sequence not numbered 0, if seqCpx belongs to (0.01, 0.20] interval, it is further determined whether i_blurRate>0.55&&seqCpx>0.07. If not, it is then determined whether i_blurRate>0.3. If not, and seqCpx>=0.15, it is further determined whether i_blurRate>0.25. If not, it is determined whether i_blurRate>0.15&&i_blurRate<0.25. If i_blurRate>0.15&&i_blurRate<0.25, the quantization parameter Q is adjusted to Q=Q+t2, t2=qt+pow(avg_psnryuy, 1.0/5)−1.0, qt=seqCpx*10. If i_blurRate>0.15&&i_blurRate<0.25 is not met, other encoding stages of the encoding process are performed.

When it is determined that the current source video frame is the initial frame of a sequence not numbered 0, if seqCpx belongs to (0.01, 0.20] interval, and i_blurRate>0.55&&seqCpx>0.07, the quantization parameter Q is adjusted to Q=Q−tf, tf=(blurRate*10+seqCpx*10)/2.

When it is determined that the current source video frame is the initial frame of a sequence not numbered 0, if seqCpx belongs to (0.01, 0.20] interval, i_blurRate>0.55&&seqCpx>0.07 is not met, and i_blurRate>0.3, the quantization parameter Q is adjusted to Q=Q−tf, tf=(blurRate*10+seqCpx*10)/2.

After the adjustment is completed, other stages of the encoding process are performed to complete the video transcoding process. Certainly, if the current source video frame is not the initial frame of a sequence not numbered 0, a quantization parameter adjustment method corresponding to other affected frames is used for adjustment.

S212. When the sequence number is a non-initial sequence number and the frame number is a front affected frame number; or the sequence number is a non-initial sequence number and the frame number is a middle affected frame number, or the sequence number is a non-initial sequence number and the frame number is a rear affected frame number, the video transcoding device obtains the second ratio of the sum of absolute transformed differences of the source video frame to the bit rate of the video sequence and the third ratio of the image blurriness of the source video frame to the sum of absolute transformed differences of the source video frame, and obtains a fourth ratio of image blurriness of the initial frame in the video sequence to the sum of absolute transformed differences of the initial frame.

When the sequence number is a non-initial sequence number and the frame number is a front affected frame number or the sequence number is a non-initial sequence number and the frame number is a middle affected frame number, or the sequence number is a non-initial sequence number and the frame number is a rear affected frame number, it indicates that the current source video frame is a front affected frame, or a middle affected frame, or a rear affected frame of a video sequence not numbered 0 (for example, numbered 1, 2, . . . , n), the second ratio picRate=SATD of the current source video frame image/the bit rate of the video sequence, the third ratio blurRate=the image blurriness of the current source video frame image/SATD of the current source video frame image, and the fourth ratio i_blurRate=the image blurriness of the initial frame/the sum of absolute transformed differences of the initial frame are calculated.

Figure 9:
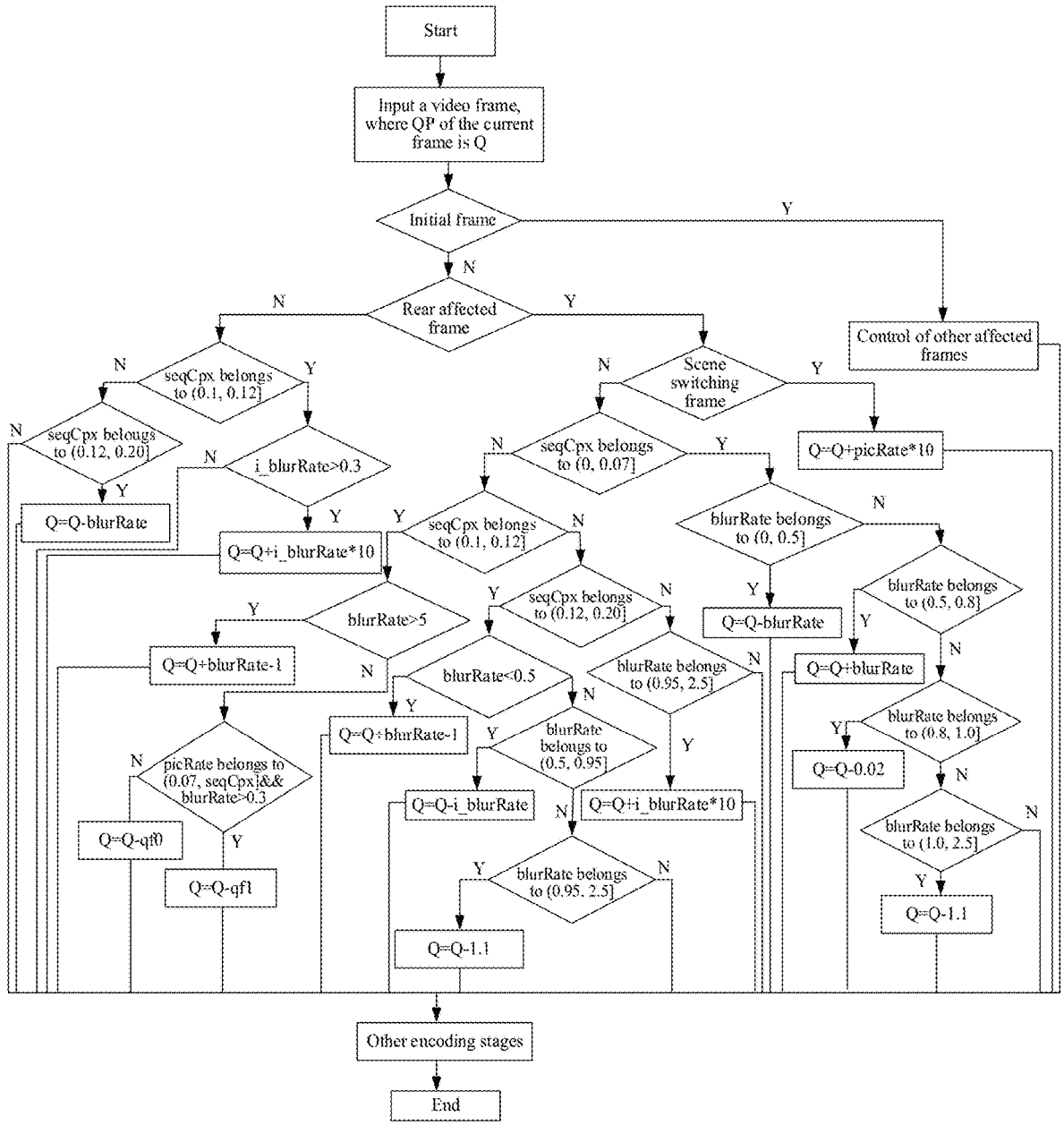
FIG. 9 is a schematic diagram of a process of adjusting a quantization parameter according to an embodiment of the present disclosure.

S213. The video transcoding device adjusts the quantization parameter of the source video frame based on the first ratio, the second ratio, the third ratio, and the fourth ratio. Refer to FIG. 9 for the specific adjustment process.

In one embodiment, the distribution of seqCpx may further include a plurality of sub-intervals, such as (0.12, 0.20], (0.12, 0.20], and (0, 0.07].

When it is determined that the current source video frame is a non-initial frame of a sequence not numbered 0, if the current source video frame is not a rear affected frame, seqCpx does not belong to (0.1, 0.12] interval, but belongs to (0.12, 0.20] interval, the quantization parameter Q is adjusted to Q=Q−blurRate.

When it is determined that the current source video frame is a non-initial frame of a sequence not numbered 0, if the current source video frame is not a rear affected frame, seqCpx belongs to (0.10, 0.12] interval and i_blurRate>0.3, the quantization parameter Q is adjusted to Q=Q+i_blurRate*10.

When it is determined that the current source video frame is a non-initial frame of a sequence not numbered 0, if the current source video frame is a rear affected frame and is not a scene switching frame, it is further determined whether seqCpx belongs to (0, 0.07] interval. If seqCpx does not belong to (0, 0.07] interval, it is then determined whether seqCpx belongs to (0.10, 0.12] interval. If seqCpx belongs to (0.10, 0.12] interval, and blurRate>5, the quantization parameter Q is adjusted to Q=Q+blurRate−1.

When it is determined that the current source video frame is a non-initial frame of a sequence not numbered 0, if the current source video frame is a rear affected frame and is not a scene switching frame, it is further determined whether seqCpx belongs to (0, 0.07] interval. If seqCpx does not belong to (0, 0.07] interval, it is then determined whether seqCpx belongs to (0.10, 0.12] interval. If seqCpx belongs to (0.10, 0.12], and blurRate<=5, it is then determined whether picRate belongs to (0.07, seqCpx)&&blurRate>0.3). If picRate does not belong to (0.07, seqCpx)&&blurRate>0.3, the quantization parameter Q is adjusted to Q=Q−qf0, qf0=(picRate*100+blurRate*10)/2.5.

When it is determined that the current source video frame is a non-initial frame of a sequence not numbered 0, if the current source video frame is a rear affected frame and is not a scene switching frame, it is further determined whether seqCpx belongs to (0, 0.07] interval. If seqCpx does not belong to (0, 0.07] interval, it is then determined whether seqCpx belongs to (0.10, 0.12] interval. If seqCpx belongs to (0.10, 0.12], and blurRate<=5, it is then determined whether picRate belongs to (0.07, seqCpx)&&blurRate>0.3. If picRate belongs to (0.07, seqCpx)&&blurRate>0.3, the quantization parameter Q is adjusted to Q=Q−qf1, qf1=(pass1Psnr/10)*3.0. pass1Psnr represents a YUV PSNR value generated by the current source video frame in 1 pass encoding.

When it is determined that the current source video frame is a non-initial frame of a sequence not numbered 0, if the current source video frame is a rear affected frame and is not a scene switching frame, it is further determined whether seqCpx belongs to (0, 0.07] interval. If seqCpx does not belong to (0, 0.07] interval, it is then determined whether seqCpx belongs to (0.10, 0.12] interval. If seqCpx does not belong to (0.10, 0.12] interval, when seqCpx belongs to (0.12, 0.20] interval and blurRate<0.5, the quantization parameter Q is adjusted to Q=Q+blurRate−1.

When it is determined that the current source video frame is a non-initial frame of a sequence not numbered 0, if the current source video frame is a rear affected frame and is not a scene switching frame, it is further determined whether seqCpx belongs to (0, 0.07] interval. If seqCpx does not belong to (0, 0.07] interval, it is then determined whether seqCpx belongs to (0.10, 0.12] interval. If seqCpx does not belong to (0.10, 0.12] interval, when seqCpx belongs to (0.12, 0.20] interval and blurRate>=0.5, it is further determined whether blurRate belongs to (0.5, 0.95] interval. When seqCpx belongs to (0.12, 0.20] interval and blurRate belongs to (0.5, 0.95], the quantization parameter Q is adjusted to Q=Q−i_blurRate.

When it is determined that the current source video frame is a non-initial frame of a sequence not numbered 0, if the current source video frame is a rear affected frame and is not a scene switching frame, it is further determined whether seqCpx belongs to (0, 0.07] interval. If seqCpx does not belong to (0, 0.07] interval, it is then determined whether seqCpx belongs to (0.10, 0.12] interval. If seqCpx does not belong to (0.10, 0.12] interval, when seqCpx belongs to (0.12, 0.20] interval and blurRate>=0.5, it is further determined whether blurRate belongs to (0.5, 0.95] interval. When seqCpx belongs to (0.12, 0.20] interval and blurRate does not belong to (0.5, 0.95] but belongs to (0.95, 2.5] interval, the quantization parameter Q is adjusted to Q=Q−1.1.

When it is determined that the current source video frame is a non-initial frame of a sequence not numbered 0, if the current source video frame is a rear affected frame and is not a scene switching frame, it is further determined whether seqCpx belongs to (0, 0.07] interval. If seqCpx does not belong to (0, 0.07] interval, it is then determined whether seqCpx belongs to (0.10, 0.12] interval. If seqCpx does not belong to (0.10, 0.12] interval, it is further determined whether seqCpx belongs to (0.12, 0.20] interval. When seqCpx does not belong to (0.12, 0.20] interval, but blurRate belongs to (0.95, 2.5] interval, the quantization parameter Q is adjusted to Q=Q−i_blurRate*10.

When it is determined that the current source video frame is a non-initial frame of a sequence not numbered 0, if the current source video frame is a rear affected frame and is not a scene switching frame, it is further determined whether seqCpx belongs to (0, 0.07] interval. When seqCpx belongs to (0, 0.07] interval and blurRate belongs to (0, 0.05] interval, the quantization parameter Q is adjusted to Q=Q−blurRate.

When it is determined that the current source video frame is a non-initial frame of a sequence not numbered 0, if the current source video frame is a rear affected frame and is not a scene switching frame, it is further determined whether seqCpx belongs to (0, 0.07] interval. When seqCpx belongs to (0, 0.07] interval and blurRate belongs to (0.5, 0.8] interval, the quantization parameter Q is adjusted to Q=Q+blurRate.

When it is determined that the current source video frame is a non-initial frame of a sequence not numbered 0, if the current source video frame is a rear affected frame and is not a scene switching frame, it is further determined whether seqCpx belongs to (0, 0.07] interval. When seqCpx belongs to (0, 0.07] interval and blurRate belongs to (0.8, 1.0] interval, the quantization parameter Q is adjusted to Q=Q−0.02.

When it is determined that the current source video frame is a non-initial frame of a sequence not numbered 0, if the current source video frame is a rear affected frame and is not a scene switching frame, it is further determined whether seqCpx belongs to (0, 0.07] interval. When seqCpx belongs to to (0, 0.07] interval and blurRate belongs to (1.0, 2.5] interval, the quantization parameter Q is adjusted to Q=Q−1.1.

When it is determined that the current source video frame is a non-initial frame of a sequence not numbered 0, if the current source video frame is a rear affected frame and is a scene switching frame, the quantization parameter Q is adjusted to Q=Q+picRate*10.

After the adjustment is completed, other stages of the encoding process are performed to complete the video transcoding process. Certainly, if the current source video frame is not a non-initial frame of a sequence not numbered 0, a quantization parameter adjustment method corresponding to other affected frames is used for adjustment.

S214. The video transcoding device encodes the source video frame based on an adjusted quantization parameter to obtain a target video frame, and replaces the source video frame with the target video frame to obtain a video sequence after the replacement.

Specifically, after an adjusted quantization parameter is obtained by using the foregoing method, the source video frame is encoded by using the adjusted quantization parameter. After the encoding is completed, a target video frame is obtained. The target video frame is directly used to replace the original source video frame, and all the source video frames in the video sequence are replaced in the same manner, thereby obtaining a video sequence after the replacement. The video sequence after the replacement is an encoded video sequence.

For example, as shown in FIG. 4, if the encoding reaches the $20^{th}$ frame currently, the adjusted quantization parameter is used to encode the $20^{th}$ frame. After the encoding is completed, the source video frame in the $20^{th}$ frame is replaced with an obtained video frame. The 50 frames are replaced in the same manner, thereby obtaining a video sequence after the replacement (that is, encoded video sequence).

S215. The video transcoding device adds the video sequence after the replacement to target video data according to the sequence arrangement order.

Specifically, the original video sequence is replaced with the video sequence after the replacement according to the corresponding sequence number before the replacement, and all the video sequences are processed in the same manner. After the replacement is completed, a transcoded target video sequence is obtained. The source video sequence and the target video sequence have the same video content, but encoding formats are different.

Figure 10:
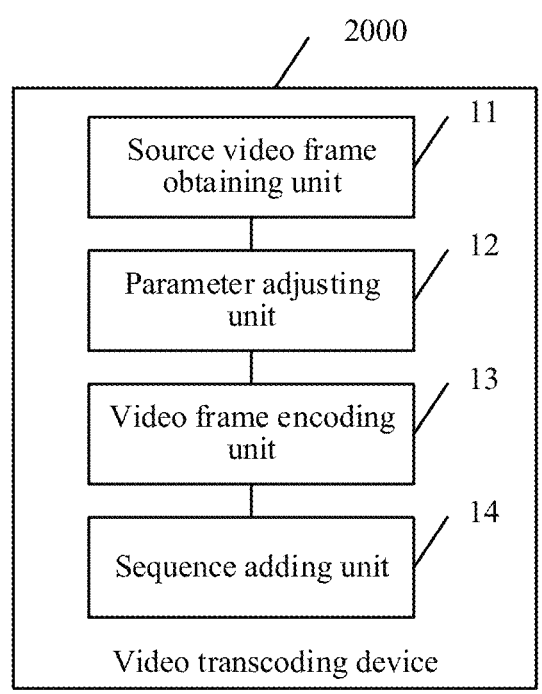
FIG. 10 is a schematic structural diagram of a video transcoding device according to an embodiment of the present disclosure.
Figure 11:
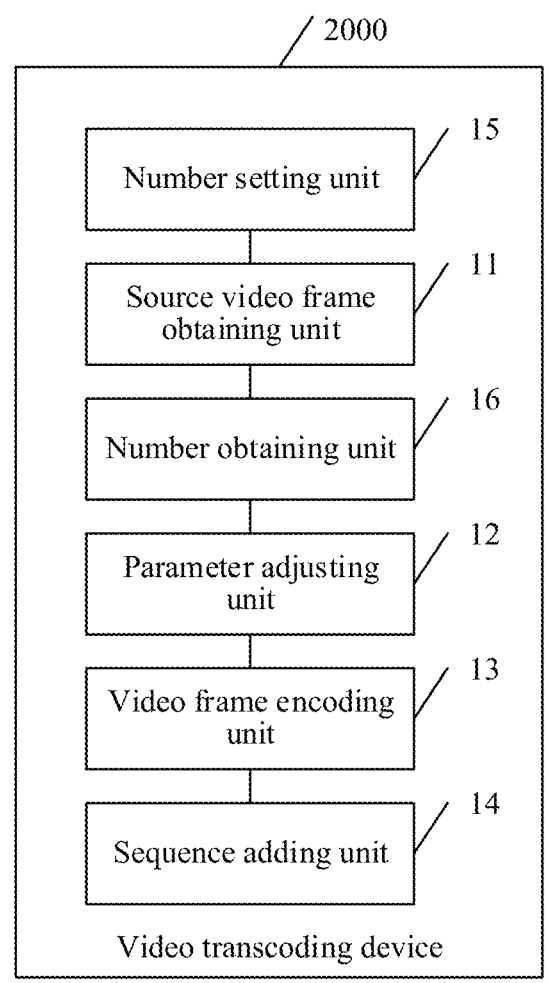
FIG. 11 is a schematic structural diagram of a video transcoding device according to an embodiment of the present disclosure.

The following describes a video transcoding device provided in one embodiment of the present disclosure in detail with reference to FIG. 10 and FIG. 11. The video transcoding device shown in FIG. 10 and FIG. 11 is configured to perform the method of the embodiments of the present disclosure shown in FIG. 2 to FIG. 9. For ease of description, only parts related to the embodiments of the present disclosure are shown. For specific technical details that are not disclosed, refer to the embodiments of the present disclosure shown in FIG. 2 to FIG. 9.

FIG. 10 is a schematic structural diagram of a video transcoding device according to an embodiment of the present disclosure. As shown in FIG. 10, a video transcoding device 2000 in one embodiment of the present disclosure may include: a source video frame obtaining unit 11, a parameter adjusting unit 12, a video frame encoding unit 13, and a sequence adding unit 14. The units disclosed herein may be program units stored in one or more memories of the object annotation apparatus and executed by one or more processors of the object annotation apparatus. Each unit and other similar terms used in this disclosure (e.g., module) can be implemented using software (e.g., computer programs or algorithms developed to perform the described functions), hardware (e.g., processing circuitry and/or memory configured to perform the described functions), or a combination thereof.

The source video frame obtaining unit 11 is configured to obtain a video sequence in source video data, and obtain a source video frame in the video sequence, the source video data including a plurality of video sequences arranged in a sequence arrangement order.

The parameter adjusting unit 12 is configured to obtain a first ratio of a sum of absolute transformed differences of an initial frame in the video sequence to a bit rate of the video sequence, and adjust a quantization parameter of the source video frame based on the first ratio.

The parameter adjusting unit 12 is specifically configured to: obtain the first ratio of the sum of absolute transformed differences of the initial frame in the video sequence to the bit rate of the video sequence; and adjust the quantization parameter of the source video frame based on the first ratio in a case that the sequence number is the initial sequence number and the frame number is the initial frame number.

The parameter adjusting unit 12 is specifically configured to: obtain the first ratio of the sum of absolute transformed differences of the initial frame in the video sequence to the bit rate of the video sequence; obtain a second ratio of a sum of absolute transformed differences of the source video frame to the bit rate of the video sequence in a case that the sequence number is the initial sequence number and the frame number is a front affected frame number, or the sequence number is the initial sequence number and the frame number is a middle affected frame number; and adjust the quantization parameter of the source video frame based on the first ratio and the second ratio.

The parameter adjusting unit 12 is specifically configured to: obtain the first ratio of the sum of absolute transformed differences of the initial frame in the video sequence to the bit rate of the video sequence; obtain a second ratio of a sum of absolute transformed differences of the source video frame to the bit rate of the video sequence and a third ratio of image blurriness of the source video frame to the sum of absolute transformed differences of the source video frame in a case that the sequence number is the initial sequence number and the frame number is a rear affected frame number; and adjust the quantization parameter of the source video frame based on the first ratio, the second ratio, and the third ratio.

The parameter adjusting unit 12 is specifically configured to: obtain the first ratio of the sum of absolute transformed differences of the initial frame in the video sequence to the bit rate of the video sequence; obtain a second ratio of a sum of absolute transformed differences of the source video frame to the bit rate of the video sequence and a third ratio of image blurriness of the source video frame to the sum of absolute transformed differences of the source video frame in a case that the sequence number is a non-initial sequence number and the frame number is the initial frame number; and adjust the quantization parameter of the source video frame based on the first ratio, the second ratio, and the third ratio.

The parameter adjusting unit 12 is specifically configured to: obtain the first ratio of the sum of absolute transformed differences of the initial frame in the video sequence to the bit rate of the video sequence; obtain a second ratio of a sum of absolute transformed differences of the source video frame to the bit rate of the video sequence, a third ratio of image blurriness of the source video frame to the sum of absolute transformed differences of the source video frame, and a fourth ratio of image blurriness of the initial frame in the video sequence to the sum of absolute transformed differences of the initial frame in a case that the sequence number is a non-initial sequence number and the frame number is a front affected frame number; or the sequence number is a non-initial sequence number and the frame number is a middle affected frame number, or the sequence number is a non-initial sequence number and the frame number is a rear affected frame number; and adjust the quantization parameter of the source video frame based on the first ratio, the second ratio, the third ratio, and the fourth ratio.

The video frame encoding unit 13 is configured to encode the source video frame based on an adjusted quantization parameter to obtain a target video frame, and replace the source video frame with the target video frame to obtain a video sequence after the replacement.

The sequence adding unit 14 is configured to add the video sequence after the replacement to target video data according to the sequence arrangement order.

As shown in FIG. 11, the video transcoding device 2000 further includes: a number setting unit 15, configured to set a sequence number set of the plurality of video sequences in the source video data, and set a frame number set of each video sequence in the plurality of video sequences, the sequence number set including an initial sequence number and non-initial sequence numbers, and the frame number set including an initial frame number, front affected frame numbers, middle affected frame numbers, and rear affected frame numbers.

As shown in FIG. 11, the video transcoding device 2000 further includes: a number obtaining unit 16, configured to obtain a sequence number of the video sequence in the sequence number set and a frame number of the source video frame in the frame number set.

The embodiments of the present disclosure further provide a storage medium, storing processor executable instructions, the instructions, when executed by one or more processors, implementing the steps of the methods of the embodiments shown in FIG. 2 to FIG. 9. For a specific execution process, refer to specific descriptions of the embodiments shown in FIG. 2 to FIG. 9. Details are not described herein again. For example, the storage medium may be a non-volatile computer-readable storage medium.

Figure 12:
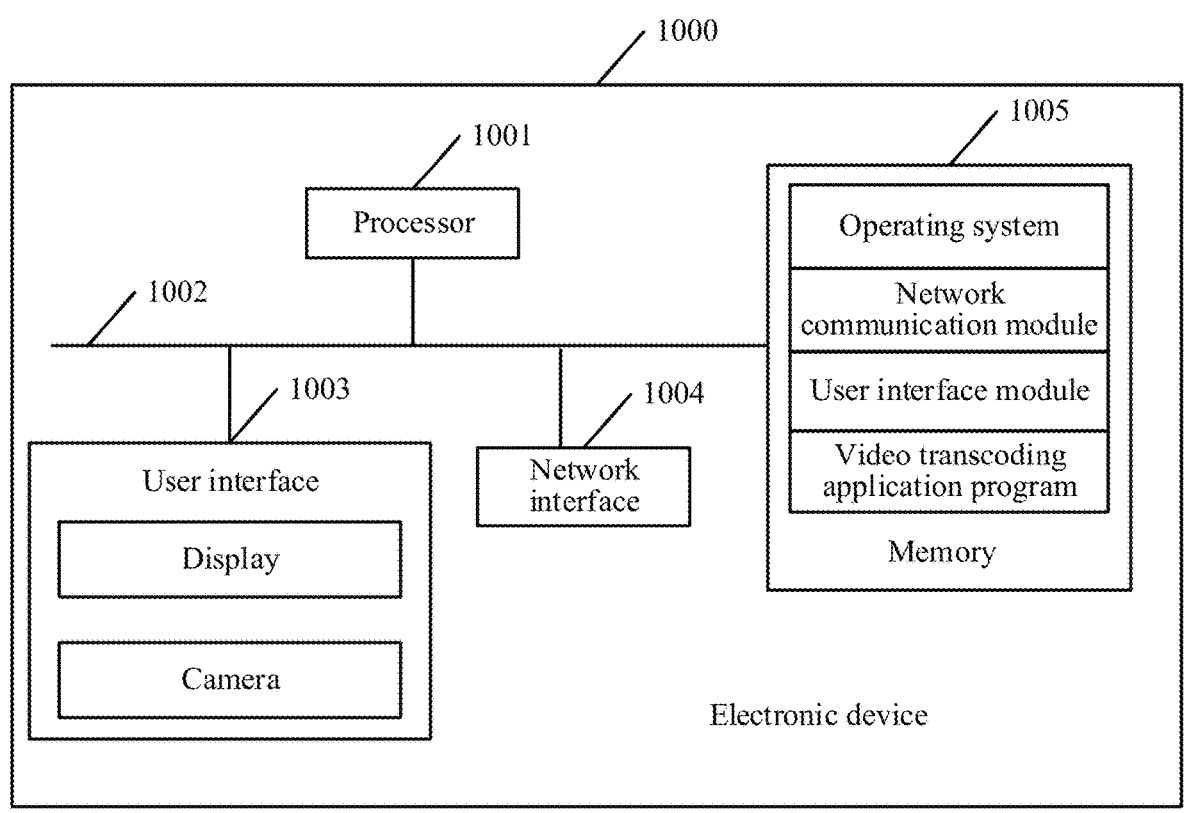
FIG. 12 is a schematic structural diagram of an electronic device according to an embodiment of the present disclosure.

FIG. 12 is a schematic structural diagram of an electronic device according to an embodiment of the present disclosure. As shown in FIG. 12, an electronic device 1000 is the video transcoding device 2000 in FIG. 1 and is configured to perform the methods of the embodiments shown in FIG. 2 to FIG. 9. The electronic device 1000 may include: at least one processor 1001, at least one network interface 1004, a user interface 1003, a memory 1005, and at least one communication bus 1002. The communications bus 1002 is configured to implement connection and communication between these components.

In the electronic device 1000 shown in FIG. 12, the user interface 1003 is mainly configured to provide an input interface for a user, to obtain data inputted by the user. The processor 1001 may be configured to invoke a video transcoding application program stored in the memory 1005, to specifically perform the following operations: obtaining a video sequence in source video data, and obtaining a source video frame in the video sequence, the source video data including a plurality of video sequences arranged in a sequence arrangement order; obtaining a first ratio of a sum of absolute transformed differences of an initial frame in the video sequence to a bit rate of the video sequence, and adjusting a quantization parameter of the source video frame based on the first ratio; encoding the source video frame based on an adjusted quantization parameter to obtain a target video frame, and replacing the source video frame with the target video frame to obtain a video sequence after the replacement; and adding the video sequence after the replacement to target video data according to the sequence arrangement order.

In an embodiment, before performing the operation of obtaining a video sequence in source video data, and obtaining a source video frame in the video sequence, the processor 1001 further performs the following operation: setting a sequence number set of the plurality of video sequences in the source video data, and setting a frame number set of each video sequence in the plurality of video sequences, the sequence number set including an initial sequence number and non-initial sequence numbers, and the frame number set including an initial frame number, front affected frame numbers, middle affected frame numbers, and rear affected frame numbers.

In an embodiment, before performing the operation of adjusting a quantization parameter of the source video frame based on the first ratio, the processor 1001 further performs the following operation: obtaining a sequence number of the video sequence in the sequence number set and a frame number of the source video frame in the frame number set.

In an embodiment, when performing the operation of obtaining a first ratio of a sum of absolute transformed differences of an initial frame in the video sequence to a bit rate of the video sequence, and adjusting a quantization parameter of the source video frame based on the first ratio, the processor 1001 specifically performs the following operations: obtaining the first ratio of the sum of absolute transformed differences of the initial frame in the video sequence to the bit rate of the video sequence; and adjusting the quantization parameter of the source video frame based on the first ratio in a case that the sequence number is the initial sequence number and the frame number is the initial frame number.

In an embodiment, when performing the operation of obtaining a first ratio of a sum of absolute transformed differences of an initial frame in the video sequence to a bit rate of the video sequence, and adjusting a quantization parameter of the source video frame based on the first ratio, the processor 1001 specifically performs the following operations: obtaining the first ratio of the sum of absolute transformed differences of the initial frame in the video sequence to the bit rate of the video sequence; obtaining a second ratio of a sum of absolute transformed differences of the source video frame to the bit rate of the video sequence in a case that the sequence number is the initial sequence number and the frame number is a front affected frame number, or the sequence number is the initial sequence number and the frame number is a middle affected frame number; and adjusting the quantization parameter of the source video frame based on the first ratio and the second ratio.

In an embodiment, when performing the operation of obtaining a first ratio of a sum of absolute transformed differences of an initial frame in the video sequence to a bit rate of the video sequence, and adjusting a quantization parameter of the source video frame based on the first ratio, the processor 1001 specifically performs the following operations: obtaining the first ratio of the sum of absolute transformed differences of the initial frame in the video sequence to the bit rate of the video sequence; obtaining a second ratio of a sum of absolute transformed differences of the source video frame to the bit rate of the video sequence and a third ratio of image blurriness of the source video frame to the sum of absolute transformed differences of the source video frame in a case that the sequence number is the initial sequence number and the frame number is a rear affected frame number; and adjusting the quantization parameter of the source video frame based on the first ratio, the second ratio, and the third ratio.

In an embodiment, when performing the operation of obtaining a first ratio of a sum of absolute transformed differences of an initial frame in the video sequence to a bit rate of the video sequence, and adjusting a quantization parameter of the source video frame based on the first ratio, the processor 1001 specifically performs the following operations: obtaining the first ratio of the sum of absolute transformed differences of the initial frame in the video sequence to the bit rate of the video sequence; obtaining a second ratio of a sum of absolute transformed differences of the source video frame to the bit rate of the video sequence and a third ratio of image blurriness of the source video frame to the sum of absolute transformed differences of the source video frame in a case that the sequence number is a non-initial sequence number and the frame number is the initial frame number; and adjusting the quantization parameter of the source video frame based on the first ratio, the second ratio, and the third ratio.

In an embodiment, when performing the operation of obtaining a first ratio of a sum of absolute transformed differences of an initial frame in the video sequence to a bit rate of the video sequence, and adjusting a quantization parameter of the source video frame based on the first ratio, the processor 1001 specifically performs the following operations: obtaining the first ratio of the sum of absolute transformed differences of the initial frame in the video sequence to the bit rate of the video sequence; obtaining a second ratio of a sum of absolute transformed differences of the source video frame to the bit rate of the video sequence, a third ratio of image blurriness of the source video frame to the sum of absolute transformed differences of the source video frame, and a fourth ratio of image blurriness of the initial frame in the video sequence to the sum of absolute transformed differences of the initial frame in a case that the sequence number is a non-initial sequence number and the frame number is a front affected frame number; or the sequence number is a non-initial sequence number and the frame number is a middle affected frame number, or the sequence number is a non-initial sequence number and the frame number is a rear affected frame number; and adjusting the quantization parameter of the source video frame based on the first ratio, the second ratio, the third ratio, and the fourth ratio.

In the embodiments of the present disclosure, by numbering video sequences in source video data and numbering source video frames in the video sequences, a video sequence in the plurality of video sequences arranged in a sequence arrangement order in the source video data is obtained, and a source video frame in the video sequence is obtained; a corresponding quantization parameter adjustment solution is determined based on a sequence number of the video sequence and a frame number of the source video frame, to adjust a quantization parameter of the source video frame; the source video frame is encoded based on an adjusted quantization parameter to obtain a target video frame; the target video frame is used to replace the source video frame to obtain a video sequence after the replacement; the video sequence after the replacement is added to target video data according to the sequence arrangement order, and all the video sequences are processed in the same manner, thereby implementing the video transcoding process. Based on a first ratio of a sum of absolute transformed differences of an initial frame in the video sequence to a bit rate of the video sequence and/or a second ratio of a sum of absolute transformed differences of the source video frame to the bit rate of the video sequence and/or a third ratio of image blurriness of the source video frame to the sum of absolute transformed differences of the source video frame and/or a fourth ratio of image blurriness of the initial frame in the video sequence to the sum of absolute transformed differences of the initial frame, the quantization parameter of each source video frame in each video sequence is adjusted, and encoding is performed by using the adjusted quantization parameter to reduce the quality jitter in the video transcoding process. It is unnecessary to perform four-channel encoding. The encoding method is simple and fast, thereby reducing the encoding time complexity.

A person of ordinary skill in the art may understand that all or some of the processes of the methods in the foregoing embodiments may be implemented by a computer program instructing relevant hardware. The program may be stored in a computer-readable storage medium. When the program is executed, the processes of the foregoing method embodiments are performed. The storage medium may be a magnetic disk, an optical disc, a read-only memory (ROM) or a random access memory (RAM), or the like.

The foregoing disclosure is merely exemplary embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A video transcoding method for a video transcoding device, comprising:
    setting a sequence number set of a plurality of video sequences in source video data, and setting a frame number set of a video sequence in the plurality of video sequences, the sequence number set including an initial sequence number and non-initial sequence numbers, and the frame number set including an initial frame number, front affected frame numbers, middle affected frame numbers, and rear affected frame numbers;
    obtaining the video sequence in the source video data, the source video data including the plurality of video sequences arranged in a sequence arrangement order;
    obtaining a source video frame in the video sequence;
    obtaining a first ratio of a sum of absolute transformed differences of an initial frame in the video sequence to a bit rate of the video sequence;
    adjusting a quantization parameter of the source video frame based on the first ratio to obtain an adjusted quantization parameter;
    encoding the source video frame based on the adjusted quantization parameter to obtain a target video frame;
    replacing the source video frame with the target video frame to obtain a replacement video sequence; and
    adding the replacement video sequence to target video data according to the sequence arrangement order.

2. The method according to claim 1, further comprising:
    obtaining a sequence number of the video sequence in the sequence number set and a frame number of the source video frame in the frame number set.

3. The method according to claim 2, wherein obtaining the first ratio of the sum of absolute transformed differences of the initial frame in the video sequence to the bit rate of the video sequence, and adjusting the quantization parameter of the source video frame based on the first ratio comprises:
  obtaining the first ratio of the sum of absolute transformed differences of the initial frame in the video sequence to the bit rate of the video sequence; and
  adjusting the quantization parameter of the source video frame based on the first ratio in response to determining that the sequence number is the initial sequence number and the frame number is the initial frame number.

4. The method according to claim 2, wherein obtaining the first ratio of the sum of absolute transformed differences of the initial frame in the video sequence to the bit rate of the video sequence, and adjusting the quantization parameter of the source video frame based on the first ratio comprises:
  obtaining the first ratio of the sum of absolute transformed differences of the initial frame in the video sequence to the bit rate of the video sequence;
  obtaining a second ratio of a sum of absolute transformed differences of the source video frame to the bit rate of the video sequence in response to determining that the sequence number is the initial sequence number and the frame number is a front affected frame number, or the sequence number is the initial sequence number and the frame number is a middle affected frame number; and
  adjusting the quantization parameter of the source video frame based on the first ratio and the second ratio.

5. The method according to claim 2, wherein obtaining the first ratio of the sum of absolute transformed differences of the initial frame in the video sequence to the bit rate of the video sequence, and adjusting the quantization parameter of the source video frame based on the first ratio comprises:
  obtaining the first ratio of the sum of absolute transformed differences of the initial frame in the video sequence to the bit rate of the video sequence;
  obtaining a second ratio of a sum of absolute transformed differences of the source video frame to the bit rate of the video sequence and a third ratio of image blurriness of the source video frame to the sum of absolute transformed differences of the source video frame in response to determining that the sequence number is the initial sequence number and the frame number is a rear affected frame number; and
  adjusting the quantization parameter of the source video frame based on the first ratio, the second ratio, and the third ratio.

6. The method according to claim 2, wherein obtaining the first ratio of the sum of absolute transformed differences of the initial frame in the video sequence to the bit rate of the video sequence, and adjusting the quantization parameter of the source video frame based on the first ratio comprises:
  obtaining the first ratio of the sum of absolute transformed differences of the initial frame in the video sequence to the bit rate of the video sequence;
  obtaining a second ratio of a sum of absolute transformed differences of the source video frame to the bit rate of the video sequence and a third ratio of image blurriness of the source video frame to the sum of absolute transformed differences of the source video frame in a case response to determining that the sequence number is a non-initial sequence number and the frame number is the initial frame number; and
  adjusting the quantization parameter of the source video frame based on the first ratio, the second ratio, and the third ratio.

7. The method according to claim 2, wherein obtaining the first ratio of the sum of absolute transformed differences of the initial frame in the video sequence to the bit rate of the video sequence, and adjusting the quantization parameter of the source video frame based on the first ratio comprises:
  obtaining the first ratio of the sum of absolute transformed differences of the initial frame in the video sequence to the bit rate of the video sequence;
  obtaining a second ratio of a sum of absolute transformed differences of the source video frame to the bit rate of the video sequence, a third ratio of image blurriness of the source video frame to the sum of absolute transformed differences of the source video frame, and a fourth ratio of image blurriness of the initial frame in the video sequence to the sum of absolute transformed differences of the initial frame in response to determining that the sequence number is a non-initial sequence number and the frame number is a front affected frame number, or the sequence number is a non-initial sequence number and the frame number is a middle affected frame number, or the sequence number is a non-initial sequence number and the frame number is a rear affected frame number; and
  adjusting the quantization parameter of the source video frame based on the first ratio, the second ratio, the third ratio, and the fourth ratio.

8. A video transcoding device, comprising: a memory storing computer program instructions; and a processor coupled to the memory and, when executing the computer program instructions, configured to perform:
  setting a sequence number set of a plurality of video sequences in source video data, and setting a frame number set of a video sequence in the plurality of video sequences, the sequence number set including an initial sequence number and non-initial sequence numbers, and the frame number set including an initial frame number, front affected frame numbers, middle affected frame numbers, and rear affected frame numbers;
  obtaining the video sequence in the source video data, the source video data including the plurality of video sequences arranged in a sequence arrangement order;
  obtaining a source video frame in the video sequence;
  obtaining a first ratio of a sum of absolute transformed differences of an initial frame in the video sequence to a bit rate of the video sequence;
  adjusting a quantization parameter of the source video frame based on the first ratio to obtain an adjusted quantization parameter;
  encoding the source video frame based on the adjusted quantization parameter to obtain a target video frame;
  replacing the source video frame with the target video frame to obtain a replacement video sequence; and
  adding the replacement video sequence after the replacement to target video data according to the sequence arrangement order.

9. The video transcoding device according to claim 8, wherein the processor is further configured to perform:
  obtaining a sequence number of the video sequence in the sequence number set and a frame number of the source video frame in the frame number set.

10. The video transcoding device according to claim 9, wherein obtaining the first ratio of the sum of absolute transformed differences of the initial frame in the video sequence to the bit rate of the video sequence, and adjusting the quantization parameter of the source video frame based on the first ratio comprises:

obtaining the first ratio of the sum of absolute transformed differences of the initial frame in the video sequence to the bit rate of the video sequence; and adjusting the quantization parameter of the source video frame based on the first ratio in response to determining that the sequence number is the initial sequence number and the frame number is the initial frame number.

11. The video transcoding device according to claim 9, wherein obtaining the first ratio of the sum of absolute transformed differences of the initial frame in the video sequence to the bit rate of the video sequence, and adjusting the quantization parameter of the source video frame based on the first ratio comprises:
obtaining the first ratio of the sum of absolute transformed differences of the initial frame in the video sequence to the bit rate of the video sequence;
obtaining a second ratio of a sum of absolute transformed differences of the source video frame to the bit rate of the video sequence in response to determining that the sequence number is the initial sequence number and the frame number is a front affected frame number, or the sequence number is the initial sequence number and the frame number is a middle affected frame number; and
adjusting the quantization parameter of the source video frame based on the first ratio and the second ratio.

12. The video transcoding device according to claim 9, wherein obtaining the first ratio of the sum of absolute transformed differences of the initial frame in the video sequence to the bit rate of the video sequence, and adjusting the quantization parameter of the source video frame based on the first ratio comprises:
obtaining the first ratio of the sum of absolute transformed differences of the initial frame in the video sequence to the bit rate of the video sequence;
obtaining a second ratio of a sum of absolute transformed differences of the source video frame to the bit rate of the video sequence and a third ratio of image blurriness of the source video frame to the sum of absolute transformed differences of the source video frame in response to determining that the sequence number is the initial sequence number and the frame number is a rear affected frame number; and
adjusting the quantization parameter of the source video frame based on the first ratio, the second ratio, and the third ratio.

13. The video transcoding device according to claim 9, wherein obtaining the first ratio of the sum of absolute transformed differences of the initial frame in the video sequence to the bit rate of the video sequence, and adjusting the quantization parameter of the source video frame based on the first ratio comprises:
obtaining the first ratio of the sum of absolute transformed differences of the initial frame in the video sequence to the bit rate of the video sequence;
obtaining a second ratio of a sum of absolute transformed differences of the source video frame to the bit rate of the video sequence and a third ratio of image blurriness of the source video frame to the sum of absolute transformed differences of the source video frame in response to determining that the sequence number is a non-initial sequence number and the frame number is the initial frame number; and
adjusting the quantization parameter of the source video frame based on the first ratio, the second ratio, and the third ratio.

14. The video transcoding device according to claim 9, wherein obtaining the first ratio of the sum of absolute transformed differences of the initial frame in the video sequence to the bit rate of the video sequence, and adjusting the quantization parameter of the source video frame based on the first ratio comprises:
obtaining the first ratio of the sum of absolute transformed differences of the initial frame in the video sequence to the bit rate of the video sequence;
obtaining a second ratio of a sum of absolute transformed differences of the source video frame to the bit rate of the video sequence, a third ratio of image blurriness of the source video frame to the sum of absolute transformed differences of the source video frame, and a fourth ratio of image blurriness of the initial frame in the video sequence to the sum of absolute transformed differences of the initial frame in response to determining that the sequence number is a non-initial sequence number and the frame number is a front affected frame number, or the sequence number is a non-initial sequence number and the frame number is a middle affected frame number, or the sequence number is a non-initial sequence number and the frame number is a rear affected frame number; and adjusting the quantization parameter of the source video frame based on the first ratio, the second ratio, the third ratio, and the fourth ratio.

15. A non-transitory computer-readable storage medium storing computer program instructions executable by at least one processor to perform:
setting a sequence number set of a plurality of video sequences in source video data, and setting a frame number set of a video sequence in the plurality of video sequences, the sequence number set including an initial sequence number and non-initial sequence numbers, and the frame number set including an initial frame number, front affected frame numbers, middle affected frame numbers, and rear affected frame numbers;
obtaining the video sequence in the source video data, the source video data including the plurality of video sequences arranged in a sequence arrangement order;
obtaining a source video frame in the video sequence;
obtaining a first ratio of a sum of absolute transformed differences of an initial frame in the video sequence to a bit rate of the video sequence;
adjusting a quantization parameter of the source video frame based on the first ratio to obtain an adjusted quantization parameter;
encoding the source video frame based on the adjusted quantization parameter to obtain a target video frame;
replacing the source video frame with the target video frame to obtain a replacement video sequence; and
adding the replacement video sequence after the replacement to target video data according to the sequence arrangement order.

16. The non-transitory computer-readable storage medium according to claim 15, the processor further performing:
obtaining a sequence number of the video sequence in the sequence number set and a frame number of the source video frame in the frame number set.

17. The non-transitory computer-readable storage medium according to claim 16, wherein obtaining the first ratio of the sum of absolute transformed differences of the initial frame in the video sequence to the bit rate of the video sequence, and adjusting the quantization parameter of the source video frame based on the first ratio comprises:

obtaining the first ratio of the sum of absolute transformed differences of the initial frame in the video sequence to the bit rate of the video sequence; and adjusting the quantization parameter of the source video frame based on the first ratio in response to determining that the sequence number is the initial sequence number and the frame number is the initial frame number.

* * * * *